(12) United States Patent
Szeto et al.

(10) Patent No.: US 10,853,511 B2
(45) Date of Patent: Dec. 1, 2020

(54) SECURELY ACCESSING AND PROCESSING DATA IN A MULTI-TENANT DATA STORE

(71) Applicant: salesforce.com, inc., San Francisco, CA (US)

(72) Inventors: Kit Pang Szeto, Sunnyvale, CA (US); Christopher James Wu, Fremont, CA (US); Ming-Yang Chen, Palo Alto, CA (US); Karl Ryszard Skucha, Sunnyvale, CA (US); Eli Levine, San Francisco, CA (US); Ka Chun Au, Millbrae, CA (US); Bilong Chen, Cupertino, CA (US); Johnson Liu, Santa Clara, CA (US)

(73) Assignee: salesforce.com, inc., San Francisco, CA (US)

( * ) Notice: Subject to any disclaimer, the term of this patent is extended or adjusted under 35 U.S.C. 154(b) by 333 days.

(21) Appl. No.: 15/924,840

(22) Filed: Mar. 19, 2018

(65) Prior Publication Data
US 2019/0286832 A1 Sep. 19, 2019

(51) Int. Cl.
*G06F 21/62* (2013.01)
*H04L 29/06* (2006.01)

(52) U.S. Cl.
CPC .......... *G06F 21/6218* (2013.01); *H04L 63/08* (2013.01); *H04L 63/102* (2013.01); *H04L 63/105* (2013.01); *H04L 63/108* (2013.01)

(58) Field of Classification Search
CPC .. G06F 21/6218; H04L 63/105; H04L 63/108
See application file for complete search history.

(56) References Cited

U.S. PATENT DOCUMENTS

| | | | | |
|---|---|---|---|---|
| 8,978,122 | B1 * | 3/2015 | Zolfonoon | H04L 63/0815 726/4 |
| 9,774,586 | B1 * | 9/2017 | Roche | H04L 63/08 |
| 9,813,303 | B1 * | 11/2017 | Guigli | H04L 61/2076 |
| 9,992,186 | B1 * | 6/2018 | Drozd | H04L 63/0823 |
| 10,057,273 | B1 * | 8/2018 | Chakraborty | G06F 21/31 |
| 10,346,785 | B2 * | 7/2019 | Tamblyn | G06Q 10/06393 |
| 10,404,702 | B1 * | 9/2019 | Chakraborty | H04L 63/10 |
| 10,505,925 | B1 * | 12/2019 | Doloff | H04L 63/107 |
| 10,511,584 | B1 * | 12/2019 | Baer | H04L 63/0884 |

(Continued)

*Primary Examiner* — Lynn D Feild
*Assistant Examiner* — Viral S Lakhia
(74) *Attorney, Agent, or Firm* — Holland & Hart LLP

(57) ABSTRACT

Methods, systems, and devices for data access and processing are described. To set up secure environments for data processing (e.g., including machine learning), an access control system may first receive approval from an authorized user (e.g., an approver) granting access to data objects in a multi-tenant data store. The system may determine tenant-specific paths for retrieving the data objects from the data store, and may initialize a number of virtual computing engines for accessing the data. Each computing engine may be tenant-specific based on the path(s) used by that computing engine, and each may include an access role defining the data objects or data object types accessible by that computing engine. By accessing the requested data objects according to the tenant-specific path prefixes and access roles, the virtual computing engines may securely maintain separate environments for different tenants and may only allow user access to approved tenant data.

20 Claims, 12 Drawing Sheets

(56) References Cited

U.S. PATENT DOCUMENTS

| | | | |
|---|---|---|---|
| 10,609,077 B1* | 3/2020 | Mehr | H04L 63/108 |
| 10,673,628 B1* | 6/2020 | Shtop | H04L 9/3213 |
| 2014/0330732 A1* | 11/2014 | Grignon | G06Q 50/01 |
| | | | 705/319 |
| 2015/0143501 A1* | 5/2015 | Cherukuri | H04L 63/02 |
| | | | 726/11 |
| 2016/0028737 A1* | 1/2016 | Srinivasan | H04L 63/0815 |
| | | | 726/1 |
| 2016/0182525 A1* | 6/2016 | Zhu | H04L 41/28 |
| | | | 726/1 |
| 2017/0142068 A1* | 5/2017 | Devarajan | H04L 43/028 |
| 2017/0201549 A1* | 7/2017 | Vincent | H04L 63/20 |
| 2017/0250988 A1* | 8/2017 | Cantrill | H04L 63/101 |
| 2018/0278675 A1* | 9/2018 | Thayer | G06F 9/45558 |
| 2018/0316685 A1* | 11/2018 | Eberlein | H04L 63/0245 |
| 2018/0349631 A1* | 12/2018 | Illendula | G06F 21/6227 |
| 2019/0058709 A1* | 2/2019 | Kempf | G06Q 30/06 |
| 2019/0065278 A1* | 2/2019 | Jeuk | G06F 9/455 |

* cited by examiner

SECURELY ACCESSING AND PROCESSING DATA IN A MULTI-TENANT DATA STORE

FIELD OF TECHNOLOGY

The present disclosure relates generally to database systems and data processing, and more specifically to securely accessing and processing data in a multi-tenant data store.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a user (e.g., a data scientist, computer engineer, etc.) working in a multi-tenant environment may desire to test code or machine-learning algorithms on data within the multi-tenant environment. The code and machine-learning algorithms may enable an enhanced experience for customers and additional users by improving, for example, predictive analytics or performing debugging procedures. However, the data from one or more of the tenants may be confidential or private. As such, efficient techniques for facilitating machine learning and code testing in a multi-tenant environment are desired.

DETAILED DESCRIPTION

Figure 1:
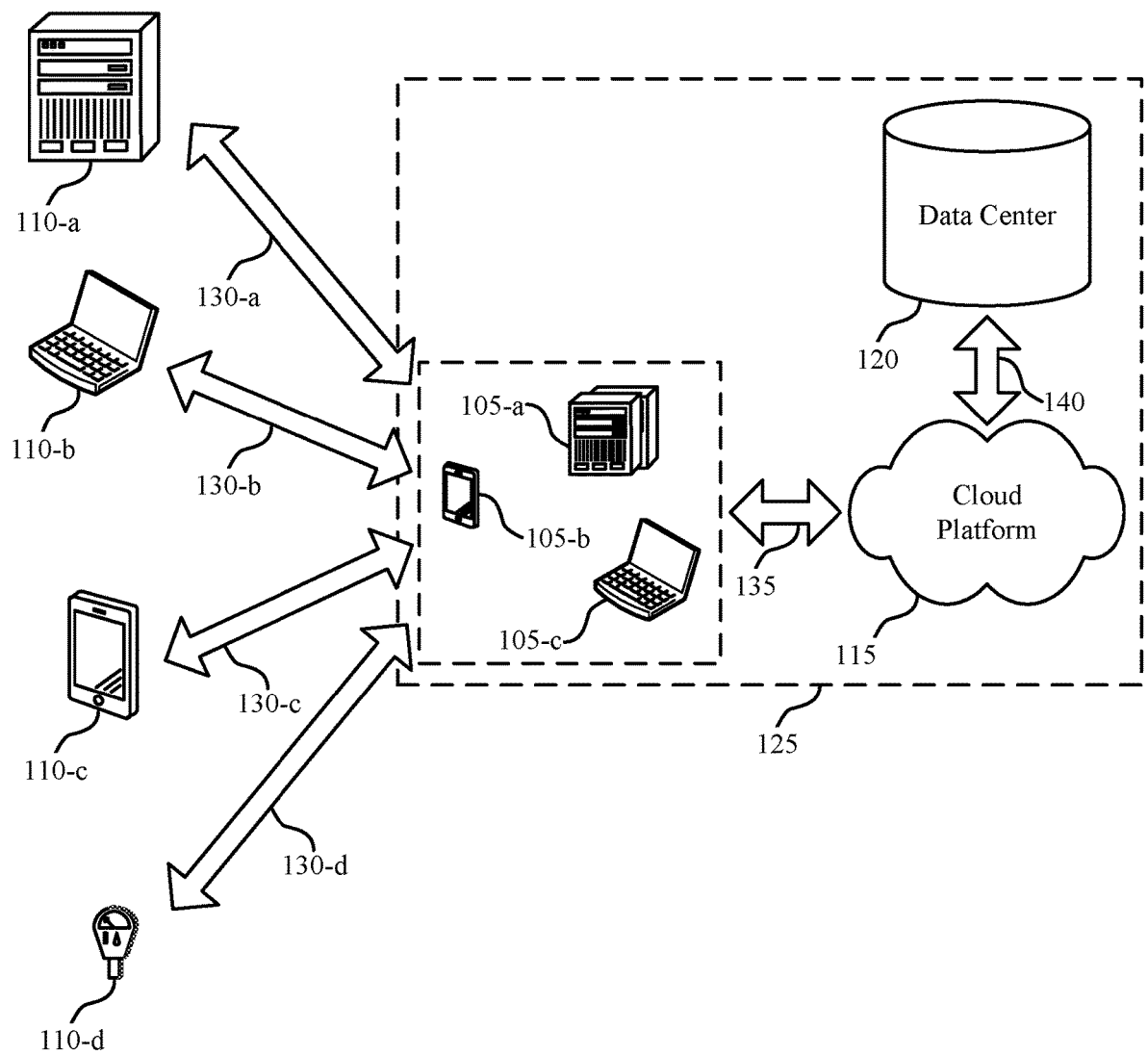
FIG. 1 illustrates an example of a system for accessing data in a multi-tenant data store that supports securely accessing and processing data in a multi-tenant data store in accordance with aspects of the present disclosure.

When a user (e.g., data scientist, computer engineer, etc.) working in a multi-tenant environment wants to test code or machine-learning algorithms on data, a system for accessing secure data for one or more of the tenants may be established. A multi-tenant system may provide functional-yet-secure access to approved tenant data. To set up secure environments for code testing (e.g., debugging) and machine learning, the system (e.g., an access control system) may first receive approval from an authorized user (e.g., an approver) granting access to data objects in a multi-tenant data store. The system may determine tenant-specific paths for accessing the data objects in the multi-tenant data store and may initialize a number of virtual computing engines (e.g., by spinning up a number of computing clusters) for accessing the data. Each virtual computing engine may be tenant-specific based on the tenant-specific paths used by that virtual computing engine. In some cases, each virtual computing engine may correspond to a separate tenant. Additionally, each virtual computing engine may include an access role defining the data objects or data object types accessible by that virtual computing engine. By accessing the requested data objects according to the tenant-specific paths and access roles, the virtual computing engines may securely maintain separate environments for different tenants and may only allow user access to approved tenant data.

In some cases, a requesting user may initiate the data access procedure by sending a request to access the data objects to the access control system. The access control system may identify users (e.g., approvers) in charge of granting or denying access to the data objects, and may forward the request to these authorized users. The approvers may send the approvals to the system based on the requests. The request may include an indication used to locate the data objects for separate tenants in the multi-tenant data store (e.g., the tenant-specific paths). Accordingly, if the data objects correspond to more than one tenant, the request may be sent to an authorized user for each tenant (e.g., a same user or different users), where each authorized user can approve or deny access to their corresponding requested data objects. After receiving approvals from the authorized user(s), the system may generate a temporary profile for the user for granting permission and accessing the data objects for each tenant in the multi-tenant data store. In some cases, the temporary profile may be associated with a token validation scheme. The temporary profile or token may expire after a certain amount of time, where access to the data objects may be revoked when this amount of time has elapsed. Additionally or alternatively, the authorized user(s) may revoke access to their corresponding data objects as desired, where the token may be revoked and/or the temporary profile may be deleted based on the authorized user(s) revoking access.

Additionally, in some cases, the system may retrieve copies of the data objects that the user requests for the code testing and machine learning. As such, the user may process or modify the copies of the data objects within the virtual computing engines without modifying the data objects stored in the multi-tenant data store. This process may support cases where the requesting users are granted read-only permissions for accessing the data.

Aspects of the disclosure are initially described in the context of an environment supporting an on-demand database service. Additional aspects of the disclosure are then represented with respect to a data approval and access scheme and flowchart, a token scheme, and a user authentication procedure. Aspects of the disclosure are further illustrated by and described with reference to apparatus diagrams, system diagrams, and flowcharts that relate to securely accessing and processing data in a multi-tenant data store.

FIG. 1 illustrates an example of a system 100 for cloud computing that supports securely accessing and processing data in a multi-tenant data store in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud platform 115 may utilize a machine learning model on data received from one or more cloud clients 105 to enhance interactions 130 between a contact 110 and the associated cloud client 105. For example, the machine learning may enable the cloud client 105 to predict a certain interaction 130 that the contact 110 intends to utilize based on historical data received and stored in the cloud platform 115 and a data center 120. The machine learning may include gathering data, preparing data, feature engineering, model training, scoring steps, or some combination of these or other similar processes involving running complex data process workflows and jobs. In some cases, gathering and preparing data may further include accessing one or more data objects associated with one or more tenants in a multi-tenant data store (e.g., the data center 120, or a component of the data center 120) in order to test (e.g., debug) code or machine-learning algorithms using the data objects. However, the data objects may include sensitive tenant data. As such, an access control system for securely accessing data for one or more of the tenants may be established.

To set up secure environments for code testing and machine learning, the access control system may first receive approval from an authorized approver (e.g., a cloud client 105) granting access to data objects in the multi-tenant data store. The access control system may determine tenant-specific paths for accessing or retrieving the data objects from the multi-tenant data store, and may initialize a number of virtual computing engines for accessing the data objects. Each virtual computing engine may be tenant-specific based on the tenant-specific paths used by that virtual computing engine (e.g., each virtual computing engine may correspond to a separate tenant). Additionally, each virtual computing engine may include an access role (e.g., an identity and access management (IAM) role) defining the data objects or data object types accessible by that virtual computing engine, or defining other permissions for the data access. By accessing the requested data objects according to the tenant-specific paths and access roles, the virtual computing engines may securely maintain separate environments for different tenants and may only allow user access to approved tenant data.

In some cases, a requesting user (e.g., a cloud client 105) may first send a data request to the authorized approvers in order to access the data objects before the access control system establishes the secure environments, where the requesting user has authority to access and experiment on data objects within the multi-tenant data store. The data request may include an indication used to locate the data objects for separate tenants in the multi-tenant data store (e.g., unique tenant identifiers that the access control system utilizes to determine the tenant-specific paths). Accordingly, if the data objects correspond to more than one tenant, the request may be sent to an authorized user for each tenant, where each authorized approver can approve or deny access to their corresponding requested data objects. After receiving approvals from the authorized approver(s), the access control system may generate a temporary profile for the requesting user to access the data objects in the established secure environment described above. In some cases, the temporary profile may be associated with a token validation scheme. The temporary profile or token may expire after a certain amount of time specified in the data request, where access to the data objects may be revoked when the amount of time has elapsed. Additionally, in some cases, the access control system may retrieve copies of the data objects that the requesting user indicates in the data request (e.g., if the access role includes read-only permissions). As such, the requesting user may process or modify the copies of the data objects within the virtual computing engines without modifying the data objects stored in the multi-tenant data store.

In conventional systems, data testing may not securely support multi-tenancy. For example, in some cases, granting multi-tenant database access to a user may allow the user to perform code testing or machine learning on any of the data in the database. In such cases, the data testing may result in mixing of data between tenants. Additionally, users with access to the data testing environment may be able to access data for multiple tenants, and in some cases may be able to modify this data in the database. In other cases, users may only be able to perform code testing or machine learning on a single tenant in a multi-tenant database.

The system 100 may support isolated data testing environments for different tenants in a multi-tenant system. For example, by spinning up separate clusters (e.g., virtual computing engines) on a tenant-by-tenant basis, the system 100 may not mix sensitive data for different tenants, but may support code testing and machine learning across multiple tenants. Additionally, a malicious user gaining access to a data testing environment may only gain access to data for a single tenant (e.g., the tenant associated with that data testing environment), and may not be able to modify that data in data center 120 based on the permissions associated with the computing cluster. In some cases, utilizing tokens, access roles, or both may stop even malicious users who access the data testing environments from loading data objects from the multi-tenant data store. By incorporating approvers for granting or denying access to data on a tenant-by-tenant basis, the system 100 may add another layer of security to the data access service.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
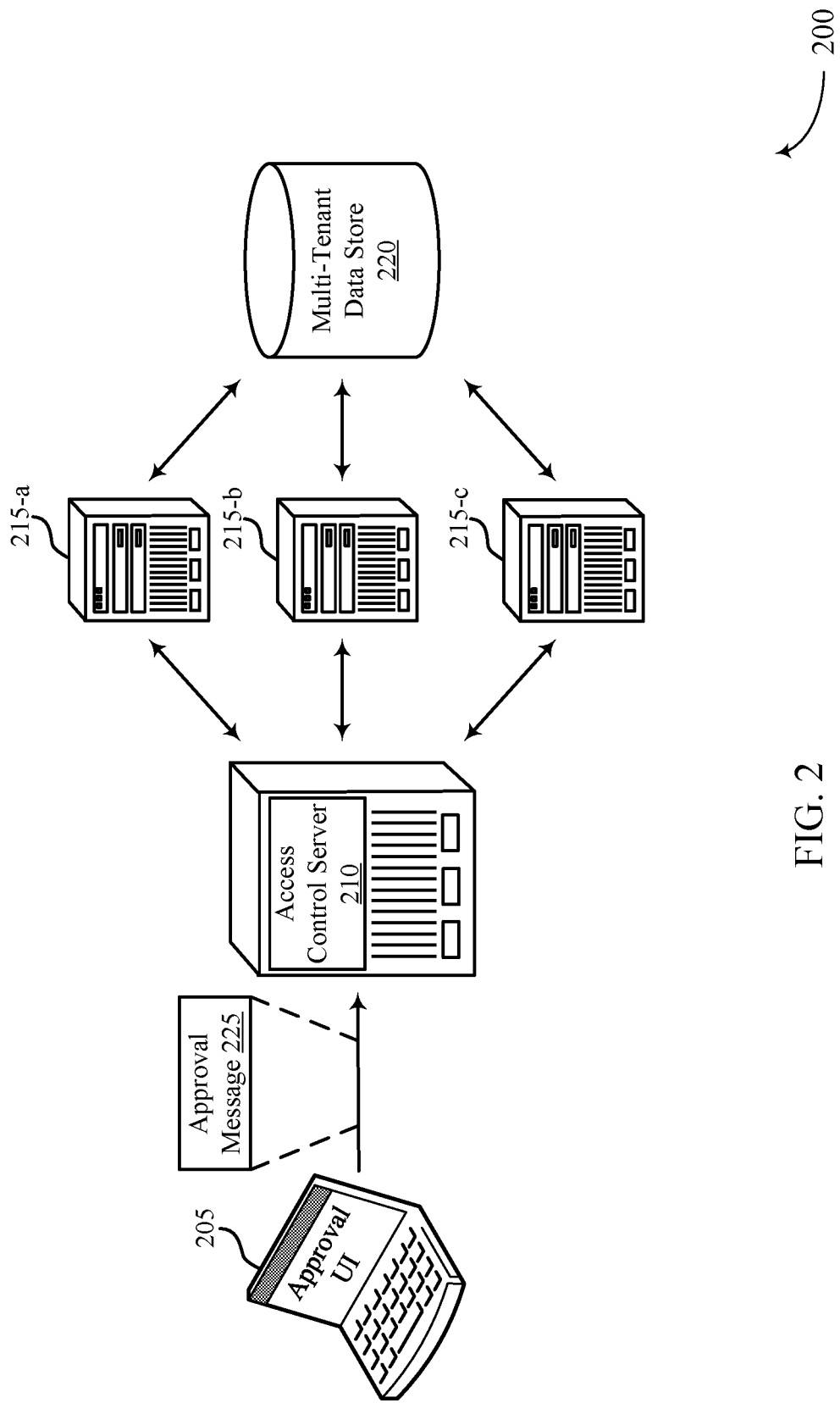
FIG. 2 illustrates an example of a data approval and access scheme that supports securely accessing and processing data in a multi-tenant data store in accordance with aspects of the present disclosure.

FIG. 2 illustrates an example of a data approval and access scheme 200 that supports securely accessing and processing data in a multi-tenant data store in accordance with various aspects of the present disclosure. Data approval scheme 200 may include an approver 205 (e.g., a user device operated by an approval user) that may indicate whether access permissions are granted for one or more data objects in a multi-tenant data store 220. In some cases, approver 205 may be an example of a cloud client 105 as described above with reference to FIG. 1, where approver 205 has the authority to grant access to data objects in multi-tenant data store 220. Approver 205 may send the "access granted" indication in an approval message 225 to an access control server 210 that may, in turn, initialize one or more virtual computing engines 215 (e.g., cluster computing engines) in order to access the one or more data objects in multi-tenant data store 220. The access control server 210, virtual computing engines 215, and multi-tenant data store 220 may be components of a subsystem 125, as described with reference to FIG. 1. For example, access control server 210 and virtual computing engines 215 may be components of the cloud platform 115, and multi-tenant data store 220 may be a component of the data center 120. The virtual computing engines 215 (e.g., virtual computing engines 215-a, 215-b, and 215-c) may run on a same server or server cluster, or may run on separate servers or server clusters.

In some cases, the approval process may be initiated by a requesting user (e.g., a user operating a requesting user device, not shown). The requesting user may request access to one or more data objects by sending an access request to the access control server 210. In the access request, the requesting user may include an indication of the one or more data objects, unique tenant identifiers for specific tenants hosted by the multi-tenant data store 220, or both. In some cases, the indication of the one or more data objects and/or unique tenant identifiers may enable access control server 210 and multi-tenant data store 220 to determine tenant-specific paths for accessing the data. In some examples, the requesting user or the requesting user device may be authenticated to determine if they are authorized to access functions or interfaces for the access control server 210. The authentication may include a username, a password, a personal identification number (PIN), a biometric input, a multi-factor authentication (e.g., two-factor authentication) procedure, or a combination thereof. To determine whether the requesting user may access the requested data objects, the access control server 210 may transmit an approval request the approver 205.

The approver 205 may transmit an approval message 225 to the access control server 210, for example, based on receiving the approval request and selecting, in an approval user interface (UI), to grant the requested access. Upon receiving the approval message 225, access control server 210 may query multi-tenant data store 220 for paths to access the one or more data objects indicated in the approval message 225. These paths may refer to any process or indication for accessing the data objects in the multi-tenant data store 220. For example, the paths may refer to data access paths, data access links, row or column identifiers, dataset or record identifiers, or any combination of these or other procedures or formats for accessing specified data within multi-tenant data store 220. In some cases, the one or more data objects may correspond to different tenants within multi-tenant data store 220, to different types of data objects (e.g., account, contact, opportunity, etc.) for a single tenant, or a combination thereof. Accordingly, the paths may be determined or generated in such a way to provide access to the data objects indicated in the approval message 225 without granting access to any other data objects stored in multi-tenant data store 220.

For example, multi-tenant data store 220 may contain additional data objects for other tenants or of other data object types not included in the approval message 225. The access control server 210 may retrieve tenant-specific paths for accessing data associated with each authorized tenant. In some cases, the tenant-specific paths may include tenant-specific path prefixes for indicating the one or more data objects (e.g., the path prefix may limit the access to data objects in the multi-tenant data store 220 owned by the corresponding tenant). In some cases, the access control server 210 may determine the tenant-specific paths based on paths stored in a data lake associated with multi-tenant data store 220, metadata stored in a metadata database associated with multi-tenant data store 220, or a combination thereof, where the query message for the tenant-specific paths is transmitted to the data lake or metadata database.

When the tenant-specific paths have been received, access control server 210 may initialize virtual computing engines 215-a, 215-b, and 215-c to access the one or more data objects indicated in the approval message 225. Each virtual computing engine 215 may correspond to a single tenant such that the number of initialized virtual computing engines 215 equals the number of tenants associated with the one or more data objects. For example, virtual computing engine 215-a may be associated with a first tenant, virtual computing engine 215-b may be associated with a second tenant, and virtual computing engine 215-c may be associated with a third tenant, where approver 205 has the authority to grant access for data objects corresponding to each of these three tenants. Alternatively, although not shown, separate approvers 205 may send individual approval messages 225 to access control server 210 for each tenant associated with the one or more data objects (e.g., one approver 205 for the first tenant, one approver 205 for the second tenant, etc.). Each of the tenant-specific virtual computing engines 215 may access the data objects for the corresponding tenant using the retrieved tenant-specific paths. For example, as illustrated, virtual computing engine 215-a may be assigned any tenant-specific paths corresponding to a first tenant (e.g., a single tenant-specific path for accessing any data for the first tenant, multiple tenant-specific and object type-specific paths for restricting access to multiple specific types of data objects for the first tenant, etc.), virtual computing engine 215-b may be assigned any tenant-specific paths corresponding to a second tenant, and virtual computing engine 215-c may be assigned any tenant-specific paths corresponding to a third tenant. In some cases, all of the virtual computing engines 215 utilized by access control server 210 may run on a shared computing cluster.

In addition to being tenant-specific, each virtual computing engine 215 may be associated with an access role (e.g., an IAM role) that limits access to the data objects indicated in the approval message 225. As described above, the tenant-specific paths may indicate an individual tenant. The access role may indicate which data objects or data object types can be accessed for that tenant based on the approval message 225. In some cases, virtual computing engines 215 may retrieve the actual data objects from multi-tenant data store 220. Alternatively, copies of the data objects may be retrieved from multi-tenant data store 220 such that copies of the data objects may be processed and edited at access control server 210 without modifying the actual data objects stored in multi-tenant data store 220. For example, the approval message 225 may grant read-only permissions for accessing the data objects at multi-tenant data store 220, and the access control server 210 may determine a corresponding read-only access role for the virtual computing engines 215.

Through virtual computing engines 215, access control server 210 may access the one or more data objects indicated in the approval message according to the tenant-specific paths and access role for each virtual computing engine 215. By spinning up multiple virtual computing engines 215, each for a single specific tenant, the access control server 210 may maintain data for different tenants in separate, isolated environments. As such, the virtual computing engines 215 may provide secure environments for code testing and machine learning associated with one or more data objects without risking mixing data for different tenants. By utilizing an approver 205 and an access role, the access control server 210 may further protect against a malicious user from accessing data using stolen authentication credentials, and from users modifying data in the multi-tenant data store 220 (e.g., either maliciously or accidently). In some cases, access control server 210 may generate a temporary user profile that can be used to access the one or more data objects indicated in the approval message 225.

Once the one or more data objects have been processed and/or studied in the isolated virtual computing engines 215, access control server 210 may no longer need access to the one or more data objects indicated in the approval message 225. As such, access control server 210 may delete the temporary user profile, terminate the one or more corresponding virtual computing engines 215, revoke access to the one or more data objects, or a combination thereof. In some cases, approver 205 may send an indication to revoke access to one or more of the data objects to access control server 210, and access control server may proceed accordingly to remove the corresponding profile, virtual computing engine 215, or access path. Additionally or alternatively, an expiration timestamp may be associated with one or more data objects in the approval message 225, and when a current timestamp equals or exceeds the expiration timestamp, access control server 210 may revoke access to the corresponding data objects. In yet other cases, an approval message 225, a temporary user profile, or the virtual computing engines 215 may be associated with a time-to-live (TTL) value. A TTL process may identify a creation timestamp for the approval message 225, temporary user profile, or virtual computing engine 215, and may determine when an amount of time equal to the TTL value has passed since the creation timestamp. The TTL process may revoke access to corresponding data objects based on this determination.

Additionally, in some cases, the requesting user may include the expiration timestamp for accessing the one or more data objects in the access request. Accordingly, the requesting user may utilize the temporary user profile generated by access control server 210 to access the one or more data objects until the expiration timestamp is reached. The requesting user may further extend the expiration timestamp by sending additional access requests for approver 205 to approve in order to extend the access to the one or more data objects. In some cases, the requesting user and temporary user profile may be associated with a token validation scheme, where a token associated with the temporary user profile is transmitted to the requesting user for accessing one or more of the data objects, and where the token can be revoked in a similar manner as described above. The access permissions may be saved (e.g., stored in memory) in an access-control service history for auditing purposes.

Figure 3:
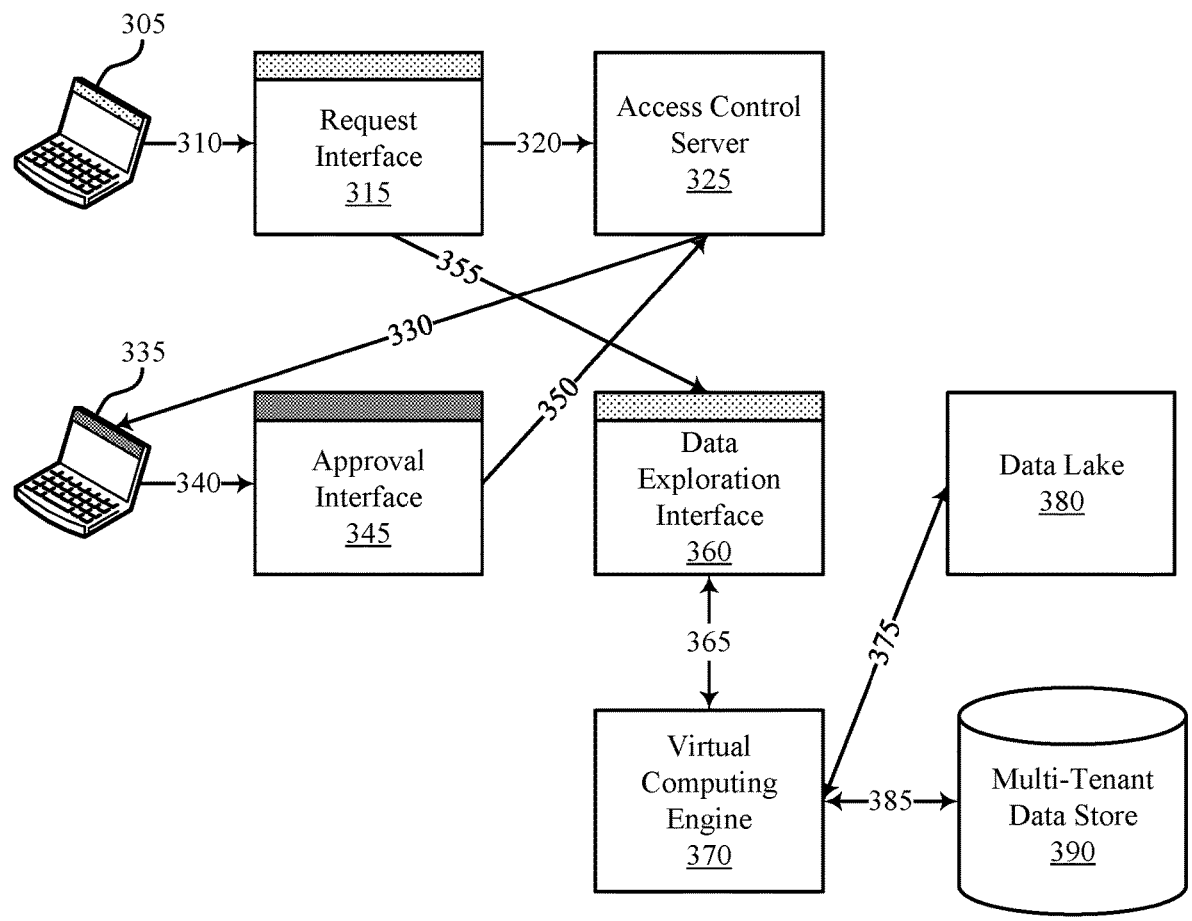
FIG. 3 illustrates an example of a data approval and access flowchart that supports securely accessing and processing data in a multi-tenant data store in accordance with aspects of the present disclosure.

FIG. 3 illustrates an example of a data approval and access flowchart 300 that supports securely accessing and processing data in a multi-tenant data store in accordance with various aspects of the present disclosure. Data approval and access flowchart 300 may include a requesting user 305 that is requesting access to one or more data objects in a multi-tenant data store 390, where an approver 335 may grant access to the one or more data objects, and an access control server 325 may establish a secure environment for requesting user 305 to access the one or more data objects via virtual computing engine 370, as described herein. Requesting user 305 and approver 335 may be examples of user devices, such as cloud clients, requesting users, or approvers as described with reference to FIGS. 1 and 2. These user devices may display UIs that support user interaction, including but not limited to a request interface 315, a data exploration interface 360, or an approval interface 345. In some cases, the request interface 315 may include token validation, application programming interface (API) validation, a request table in memory, or some combination of these features. Similarly, the approval interface 345 may include token validation, API validation, or some combination of these features. Access control server 325, virtual computing engine 370, and multi-tenant data store 390 may be examples of corresponding devices as described with reference to FIG. 2.

At 310, requesting user 305 may request access for one or more data objects through a request interface 315 (e.g., a request web UI). In some cases, request interface 315 may authenticate that requesting user 305 is in an active directory and has permission to request the access. For example, with respect to FIG. 1, cloud clients 105 may be authorized to send access requests, while contacts 110 may not be authorized to send these requests. If the authentication is successful, a form for filling out the access request may be displayed on request interface 315 for requesting user 305. The access request may include an indication of user(s) that are requesting access to the one or more data objects, an expiration date (e.g., expiration timestamp) for the access, indications of tenants (e.g., unique tenant identifier) that own the one or more data objects, or some combination of these indications.

At 320, the access request may be logged by access control server 325 (e.g., a request and approval controller). Logging the request may involve storing an indication of the request in memory, along with any additional relevant information (e.g., a timestamp for receiving the request, an expected or actual processing overhead or latency associated with performing the request, etc.). In some cases, access control server 325 may be backed by a transactional database, which may utilize the access request log to rollback or redo certain access procedures.

At 330, access control server 325 may determine an approver for the one or more data objects indicated in the access request. For example, access control server 325 may search for the approver in a database (e.g., the transactional database, or another database with tenant information). The database may store indications of the tenants corresponding to multi-tenant data store 390 and indications of approvers 335 for each tenant. Access control server 325 may identify approver 335 (e.g., based on a tenant for the requested data objects) and send a notification (e.g., an e-mail, a notification in approval interface 345, etc.) to approver 335 that a user is requesting access to one or more data objects that the approver 335 has the appropriate credentials to authorize. In some cases, the data objects indicated in the access request belong to more than one tenant. In these cases, the access control server 325 may identify approvers 335 corresponding to each of the tenants. In some examples, a single approver 335 may have sufficient credentials to approve access request for multiple tenants. In these examples, access control server 325 may send such an approver 335 an aggregate approval notification for multiple tenants, or separate approval notifications for each of the tenants. The notification may direct approver 335 to access (e.g., via a link) an approval interface 345 to respond to the access request. In some cases, this notification may be referred to as an approval request.

At 340, approver 335 may access approval interface 345 (e.g., an approval web UI). The approval interface 345 may display, to the approver 335, the access request information from requesting user 305. This information may include the one or more data objects, tenants corresponding to these data objects, a time frame for the access, a reason for the access, etc. Accordingly, approver 335 may approve or reject the access request.

If approver 335 rejects the access request, the requesting user 305 may not be granted access to the requested data objects. For example, the access control server 325 may send an indication to the request interface 315 that the access is denied. In some cases, the approver 335 may reject the access request based on specific information within the request. For example, the approver 335 may deny the request based on certain data objects or tenants that the requesting user 305 is requesting access for, or based on an expiration date for the access. In these cases, the approver 335—in the approval interface 345—may indicate the reason for the rejection, and the request interface 315 may accordingly display the reason for the rejection to the requesting user 305. The requesting user 305 may revise the access request (e.g., to fix the issues with the request indicated by the approver 335), and input the revised access request into the request interface 315 to repeat the process for acquiring data access.

If approver 335 approves the access request, the approval may be logged to access control server 325 at 350. As such, access control server 325 may start setting up an isolated environment (e.g., a secure, single-tenant environment) for requesting user 305 to access the one or more data objects indicated in the access request. First, access control server 325 may query a data lake 380 associated with multi-tenant data store 390 to determine tenant-specific paths (e.g., based on tenant-specific path prefixes) for accessing the one or more data objects. Additionally, access control server 325 may create an access role (e.g., IAM role) for requesting user 305 and attach created permissions to the access role, where the created permissions may be associated with the one or more data objects indicated in the access request. For example, the access role may indicate which data objects requesting user 305 may access in multi-tenant data store 390 for each tenant according to the tenant-specific paths. In some cases, created permissions may include read-only permissions for the data objects requested by requesting user 305.

Additionally, in some cases, at 350, access control server 325 may spin up virtual computing engine 370 associated with a specific tenant (e.g., based on an assigned tenant-specific path for accessing data) and with an access role attached. The virtual computing engine 370 may be an example of a Spark cluster, and may run inside a virtual private cloud (VPC) with a private endpoint and limited or no Internet access. In a first example, access control server 325 may spin up a docking container (e.g., Zeppelin Docker container) with the access role also attached at a container level. The docking container may connect to the virtual computing engine 370 and an authentication server. Accordingly, the docking container may be configured to allow users that have been approved by approver 335 (e.g., through the access request) to access a data exploration interface 360 associated with the docking container. For example, requesting user 305 may access data exploration interface 360 in order to access the one or more data objects after approver 335 approves the access request. In some cases, the docking container and virtual computing engine 370 may not have Internet access, further improving the security of the data access. In a second example, access control server 325 may utilize an API (e.g., a Databricks REST API) to allow requesting user 305 to access the one or more data objects through data exploration interface 360. In some cases, the API may perform a validation procedure in order to grant the data access. Access control server 325 may indicate the access role (e.g., using a resource name) to the API and may grant access to requesting user 305 to use the access role. In this example, the API may spin up virtual computing engine 370, and access control server 325 may call the API to grant access to the virtual computing engine 370 for requesting user 305. The virtual computing engine 370 may not have Internet access except for a connection to the API, where the connection utilizes VPC peering or Internet Protocol (IP) whitelisting over public IPs. In some cases, the API may be accessed over secure Internet connections, and virtual computing engine 370 may not have Internet access, both of which may provide secure access to the one or more data objects. In either of the above systems, in some examples, users or user devices may be authenticated using a single sign-on (SSO) service.

At 355, requesting user 305 may access (e.g., login to) data exploration interface 360 (e.g., a docking container or an API as described above). At 365, requesting user 305 may create notebooks in data exploration interface 360 and run the notebooks on virtual computing engine 370. Each notebook may support a platform for running executable code that depends on the tenant-specific data accessed by that virtual computing engine 370. For example, at 375, code in the notebooks may use a software development kit (SDK) associated with data lake 380 in order to retrieve the tenant-specific paths for reading the one or more data objects. In some cases, these tenant-specific paths may be obfuscated or hidden from other users of the system (e.g., including approvers 335, system administrators, etc.). At 385, virtual computing engine 370 may utilize the SDK and retrieved tenant-specific paths to read the one or more data objects directly from multi-tenant data store 390 based on the access role and created permissions.

A teardown process may occur according to a revoking scheme as described above with reference to FIG. 2. In some cases, the teardown process may be initiated manually after requesting user 305 has finished processing the one or more data objects, or by approver 335 or a system administrator. Additionally or alternatively, the teardown process may be initiated automatically after the expiration date or timestamp indicated in the access request. In either case, access control server 325 may be triggered to remove a data access request. Accordingly, access control server 325 may locate and destroy (i.e., spin down) virtual computing engine 370 associated with the one or more data objects. In some cases, access control server 325 may locate and destroy data exploration interface 360 (e.g., in the docking container embodiment) associated with virtual computing engine 370. The code executed within data exploration interface 360 may or may not be deleted along with the data exploration interface 360. Access control server 325 may additionally remove access corresponding to the access role from the tenant-specific paths in data lake 380.

Figure 4:
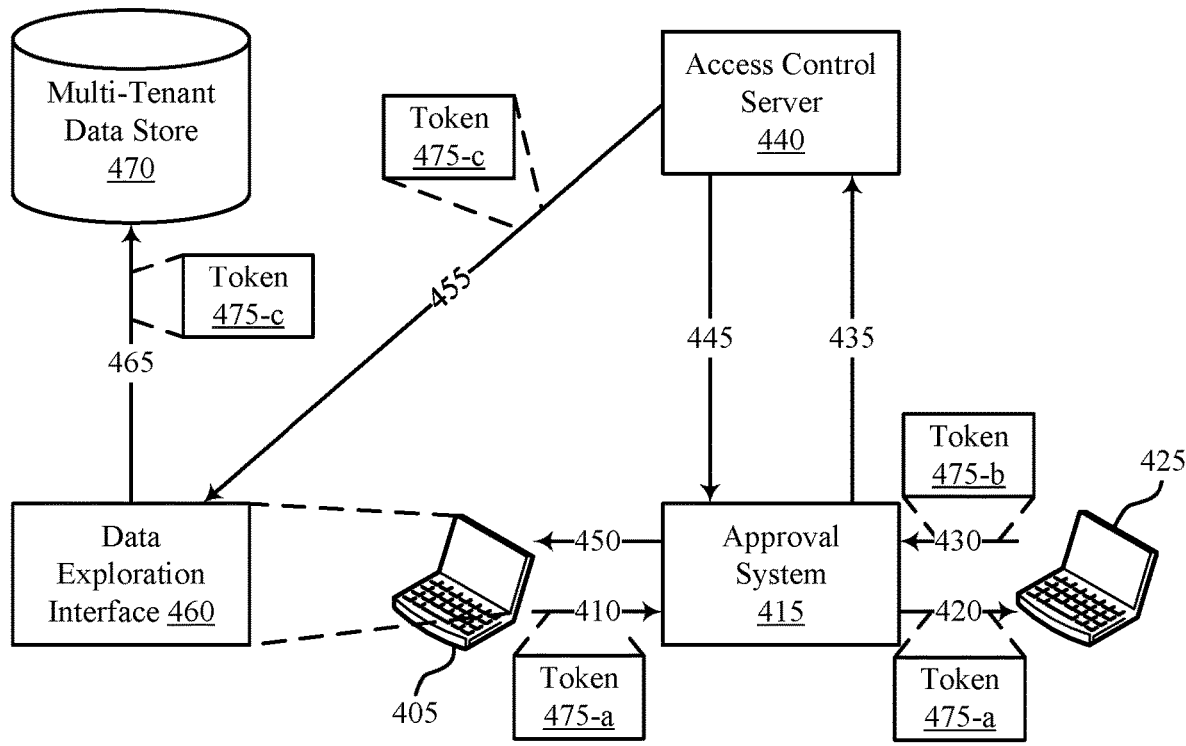
FIG. 4 illustrates an example of a token scheme that supports securely accessing and processing data in a multi-tenant data store in accordance with aspects of the present disclosure.

FIG. 4 illustrates an example of a token scheme 400 that supports securely accessing and processing data in a multi-tenant data store in accordance with various aspects of the present disclosure. Token scheme 400 may include assigning a token 475 for a requesting user 405 to use as part of a temporary user profile to access one or more data objects from a multi-tenant data store 470, as described herein. Accordingly requesting user 405 may request access for the one or more data objects from an approver 425. Approver 425 may then approve the requesting user 405 for access to the data objects. In response, the access control server 440 may assign token 475-c to requesting user 405 as part of a temporary user profile. Requesting user 405, approver 425, access control server 440 and multi-tenant data store 470 may be examples of corresponding devices as described above with reference to FIGS. 2 and 3.

At 410, requesting user 405 may make a request with a first token 475-a generated from a script. As requesting user 405 may not have the appropriate credentials for accessing the data objects without first obtaining approval, the first token 475-a may not cover permissions (e.g., an access role) for tenants associated with the one or more data objects. As such, requesting user 405 may send the request to an approval system 415. In some cases, the request may include an identification for requesting user 405 (e.g., an e-mail address), an application name for the request, a unique tenant identification, a dataset identification (e.g., an indication for the one or more data objects), a dataset type, an identification for approver 425, a reason to be displayed for approver 425, a begin and end date, the first token, or a combination thereof. If the begin date is not supplied, the current date may be used for the begin date. If the end date is not supplied, a predetermined amount of time may be used (e.g., thirty days after the begin date). The dataset identification and dataset type may be optional. If neither are provided, the request may apply for all datasets and/or data types for the tenant. Approval system 415 may determine if the request was successful based on the different components of the request. For example, approval system 415 may determine a successful request if the requested begin and end dates fall within an allowable length (e.g., less than 30 days), the request is not a duplicate of another request, any unique tenant identification is valid, approver 425 owns or is associated with the tenant(s) indicated by the unique tenant identification, the dataset identification is a valid dataset, the reason field is not empty, the identifications for requesting user 405 and approver 425 have the correct domain, the begin and end dates are current or in the future, or some combination of these or similar criteria. If approval system 415 identifies an unsuccessful request (e.g., based on one or more of the previously listed criteria), approval system 415 may mark the request as a failed request and/or throw an error. For example, the approval system 415 may utilize specific response codes to indicate fields in a request that do not pass validation. Alternatively, approval system 415 may not catch one or more of these errors, and instead approver 425 may be responsible for rejecting a request that includes these errors.

Additionally or alternatively, requesting user 405 may update the request at 410, where the update includes an identification corresponding to the initial request (e.g., a request identification). In some cases, requesting user 405 may update the request to extend the duration of the request, update the reason (e.g., if the initial reason was rejected by approver 425 or approval system 415), update the dataset identification and/or dataset type (e.g., if initial dataset and/or type were rejected by approver 425 or approval system 415), etc. As described above, approval system 415 may determine if the update was successful or a failure based on the different components of the update, or based on an indication received from approver 425.

For example, at 420, approver 425 may receive the request with first token 475-a from approval system 420. Approver 425 may then send an approval or rejection message to approval system 420 for the request with a second token 475-b generated from the same script as the first token, but indicating access permissions for the tenants associated with the data objects (e.g., based on the different credentials of the approver 425 allowing the approver 425 to grant access to data for a specific set of tenants). If approver 425 rejects the request, a reason may be included in the rejection message to requesting user 405 via approval system 415.

At 435, approval system 415 may generate a temporary user (e.g., a temporary user profile) based on if approver 425 sent an approval message in response to the request at 430. Using the temporary user profile, approval system 415 may log into access control server 440 with the temporary user and a random or pseudo-random password generated by approval system 415. Alternatively, requesting user 405 may select the password (e.g., based on a user input). Approval system 415 may register the temporary user credentials within the access control server 440. At 445, access control server 440 may indicate that the login procedure was successful for the temporary user. Accordingly, at 450, approval system 415 may pass the temporary user credentials to requesting user 405. Based on these temporary user credentials, requesting user 405 may access a data exploration interface 460 for securely working with the requested data objects in tenant-specific isolated environments.

At 455, requesting user 405 may utilize the data exploration interface 460 to retrieve a token 475-c from access control server 440 with the temporary user/password created by approval system 415. In some cases, requesting user 405 may query access control server 440 for a status of the request through data exploration interface 460. The query may include the request identification. Alternatively, the query may include the identification for requesting user 405.

At 465, requesting user 405 may query multi-tenant data store 470 through data exploration interface 460 in order to access the one or more data objects. The data exploration interface 460 may use the retrieved token 475-c and an access role (e.g., IAM role) associated with requesting user 405 (e.g., associated with the actual user device, as opposed to the user operating the user device) to access the data objects based on access permissions associated with the token 475-c. The token 475-c may have a pre-determined or dynamic expiration time. Access control server 440 may send a new or updated token 475-c prior to expiration of the previous token 475-c to maintain data access without interruption for requesting user 405 while the temporary user profile is valid. In some examples, a permission for requesting user 405 may change (e.g., based on receiving a request from requesting user 405, or based on an indication from approver 425). Access control server 440 may update token 475-c according to the permission changes.

In some cases, another user may obtain the login credentials for data exploration interface 460 (e.g., if requesting user 405 shares a temporary username and password). The user with this information may access data exploration interface 460 and query multi-tenant data store 470 using the data exploration interface 460. However, the user may not load the one or more data objects, as this user did not receive granted access from approver 425 through approval system 415, and as such may not have the token 475-c or access role required for accessing the data objects.

In some cases, the life cycle for the temporary user may be the same as an access role created by access control server 440 for exploring data objects at multi-tenant data store 470. As such, when the request for the one or more data objects expires, the access role and the temporary user profile on access control server 440 may be removed.

The data exploration interface 460 may run on a database cluster (e.g., a Spark cluster) spun up for the secure data access. In some cases, the temporary username, password, or both for the temporary user profile may be passed directly to the cluster. Accordingly, any users with access to the cluster may utilize the username, password, or both to access multi-tenant data store 470. However, these values (e.g., the username, password, etc.) may be used directly by the data exploration interface 460, and may not be revealed to the users. And as this information may be added as characteristics of the cluster, any user with access to the cluster may gain access to the one or more data objects. Accordingly, when a new user requests access to the one or more data objects, the user may be added to cluster (if the cluster exists previously). Therefore, the temporary user/password may be generated only once. When the temporary user profile expires or is removed, the cluster may be spun down, revoking data access for any users accessing the cluster.

Figure 5:
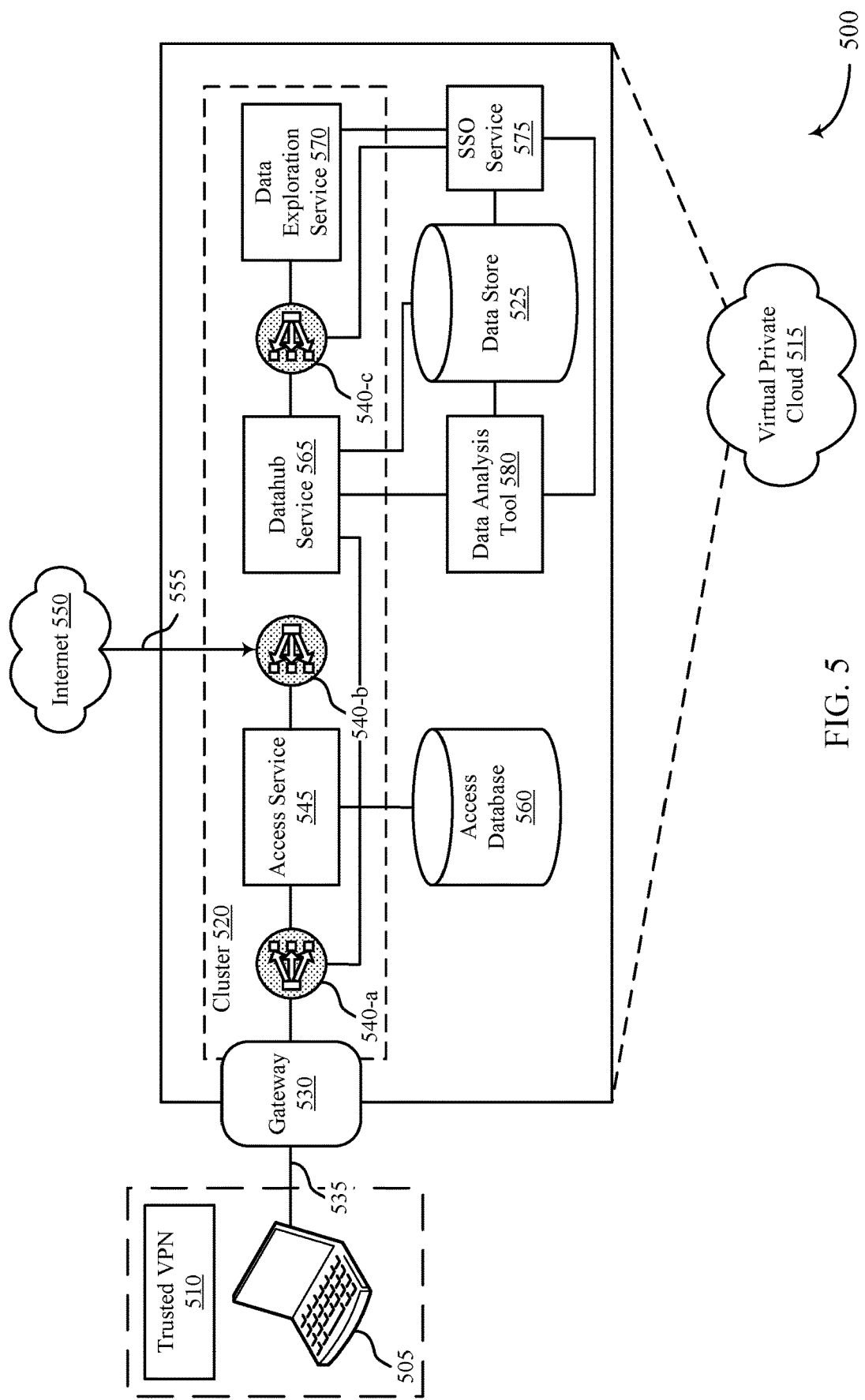
FIG. 5 illustrates an example of an access control network architecture that supports securely accessing and processing data in a multi-tenant data store in accordance with aspects of the present disclosure.

FIG. 5 illustrates an example of an access control network architecture 500 that supports securely accessing and processing data in a multi-tenant data store in accordance with various aspects of the present disclosure. A user device 505 may utilize the access control network architecture 500 for securely accessing data objects in a data store 525. This user device 505 may be an example of a cloud client or a requesting user as described above, for example, with respect to FIGS. 1 through 4. In some cases, the user device 505 may be connected to a trusted network and, correspondingly, may be associated with a trusted virtual private network (VPN) 510. In other cases, a remote user device 505 (e.g., a user device 505 outside a trusted network) may undergo an authentication procedure (e.g., using an SSO service 575) to establish a connection with the virtual private cloud 515. The authentication procedure may allow the remote user device 505 to function over a public network as if the user device 505 is operating over the trusted VPN 510.

For example, a user device 505 within a trusted network may access a data object access service 545 using virtual private cloud peering 535. In virtual private cloud peering 535, the virtual private cloud 515 may implement a VPN firewall. The VPN firewall may include a list of trusted VPNs 510 in memory, and may allow user devices 505 with one of these trusted VPNs 510 to send requests into applications within the virtual private cloud 515. The virtual private cloud peering 535 may additionally be associated with a specific gateway 530 for accessing a computing cluster 520 (e.g., a datacenter operating system (DC/OC) cluster). The gateway 530 may allow user devices 505 utilizing a same username and password combination to access the same computing cluster 520. Either the VPN firewall or the gateway 530 may support user access according to user information or groups indicated by a lightweight directory access protocol (LDAP). The computing cluster 520 may utilize a load balancer 540-*a* to handle user devices 505 accessing the computing cluster 520 using private IP addresses (e.g., IP addresses associated with the trusted network).

In other examples, a remote user device 505 outside a trusted network may access the virtual private cloud 515 using IP whitelisting 555 (e.g., not using a trusted VPN 510). The IP whitelisting 555 may include a list of trusted IP addresses or IP ranges from which user devices 505 may access the virtual private cloud 515. In some cases, an IP address may be added to the trusted list based on an authentication procedure for a remote user device 505. In other cases, a remote user device 505 may utilize a trusted IP address from the list of trusted IP addresses or IP ranges based on the authentication procedure. In these cases, a remote user device 505 may access the virtual private cloud 515 over the internet 550 and a public network. In some cases, the virtual private cloud 515 may additionally utilize a gateway 530 (e.g., a VPN gateway) for gating access to the computing cluster 520 via IP whitelisting 555. User devices 550 accessing the computing cluster 520 using public IP addresses (e.g., IP addresses not corresponding a trusted network) may be handled using load balancer 540-*b*. Load balancers 540-*a* and 540-*b* may be examples of a same load balancer 540, or may be separate load balancers 540. In some cases, the load balancers 540 may be examples of elastic load balancers, and may distribute incoming traffic from user devices 505 across multiple target application instances.

User devices 505 accessing the same computing cluster 520 (e.g., based on a same username/password combination) may access the data object access service 545 for that cluster 520. A cluster manager may manage the lifecycle of tasks within the computing cluster 520. In some cases, the cluster 520 may be an example of a data center managed cluster (e.g., managed by a data center 120 as described with respect to FIG. 1). Each data-processing cluster 520 hosted by the virtual private cloud 515 may access data objects according to an associated data store-policy configuration. The data object access service 545 may perform the functionality described above with reference to the access control servers or approval system described with respect to FIGS. 2 through 4. In some cases, the data object access service 545 may be connected with an access database 560. The access database 560 may store application-level permissions for user accounts. In some cases, the data object access service 545 may store, in the access database 560, indications of approvers and corresponding tenants managed by each approver. The data object access service 545 may utilize this list of approvers to determine an approver or approver device to send approval requests corresponding to received access requests. In other cases, the data object access service 545 may store, in the access database 560, indications of temporary user profiles and corresponding access roles for accessing specific data objects in the data store 525. The data object access service 545 may utilize these temporary user profiles and corresponding usernames, passwords, or other identifying user information to determine which users may access the computing cluster 520, data object access service 545, or the combination thereof.

The data object access service 545 may allow users to access a datahub service 565, a data exploration service 570, or both. For example, in some cases, the data object access service 545 may grant a user or user device 505 access to the datahub service 565 upon verifying a user token associated with the user or user device 505. The datahub service 565 may grant the user or user device 505 restricted access to the data store 525, to one or more data analysis tools 580 (e.g., an elastic map reduce tool, among other possible data analysis tools 580), or to a combination of these. For example, the datahub service 565 may support querying the data store 525 for data objects associated with a specific tenant, a specific data object type, a specific creation date or creation date threshold, etc.

Once the datahub service 565 retrieves the requested data objects—or read-only copies of the requested data objects—the computing cluster 520 may grant the user or user device 505 access to a data exploration service 570. The data exploration service 570 may include multiple different tenant-specific environments (e.g., notebooks) for processing the data objects. In some cases, the data exploration service 570 may allow a user device 505 to run different coding scripts, debugging tests, machine learning algorithms, or other executable codes using the retrieved data objects as inputs. The separate environments may keep code executions for each tenant separate, but may allow the user device 505 to efficiently execute the same code scripts on data for different tenants. In some cases, the data store 525, datahub service 565, data exploration service 570, data analysis tools 580, or some combination of these may utilize an SSO service 575 for authenticating users or user devices 505. Additionally, the computing cluster 520 may utilize additional load balancers 540-*c* for managing user traffic to the datahub service 565, data exploration service 570, SSO service 575, or any combination of these services.

In some cases, the virtual private cloud 515 may host multiple computing clusters 520 supporting data object access services 545. These multiple computing clusters 520 may be implemented for additional load balancing, or for introducing additional layers of tenant separation. Users or user devices 505 may access one or more of the computing clusters 520 based on sets of user credentials (e.g., granted through a token scheme as described above with respect to FIG. 4).

Figure 6:
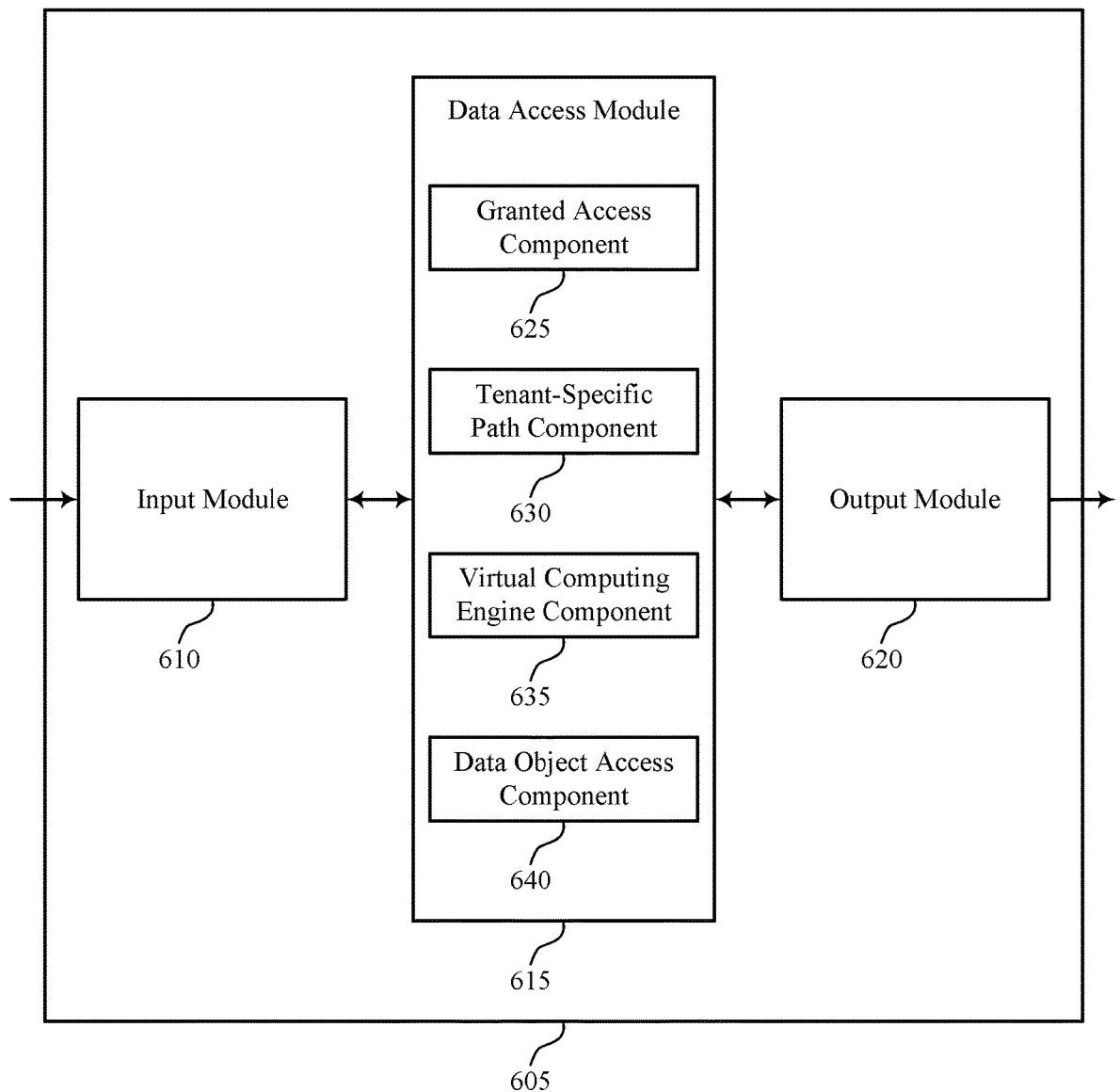
FIGS. 6 and 7 show block diagrams of a device that supports securely accessing and processing data in a multi-tenant data store in accordance with aspects of the present disclosure.

FIG. 6 shows a block diagram 600 of an apparatus 605 that supports securely accessing and processing data in a multi-tenant data store in accordance with aspects of the present disclosure. Apparatus 605 may include input module 610, data access module 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Data access module 615 may be an example of aspects of the data access module 715 or 815 described with reference to FIGS. 7 and 8.

Data access module 615 and/or at least some of its various sub-components may be implemented in hardware, software executed by a processor, firmware, or any combination thereof. If implemented in software executed by a processor, the functions of the data access module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data access module 615 and/or at least some of its various sub-components may be physically located at various positions, including being distributed such that portions of functions are implemented at different physical locations by one or more physical devices. In some examples, data access module 615 and/or at least some of its various sub-components may be a separate and distinct component in accordance with various aspects of the present disclosure. In other examples, data access module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Data access module 615 may also include granted access component 625, tenant-specific path component 630, virtual computing engine component 635, and data object access component 640.

Granted access component 625 may receive an approval message that indicates granted access to data objects that are stored in a multi-tenant data store and owned by at least one tenant. In some cases, granted access component 625 may determine one or more approval users associated with data objects for the at least one tenant, where the approval message is received from one or more user devices corresponding to the one or more approval users. In some cases, the approval message indicates one or more data object types corresponding to the data objects. Accordingly, tenant-specific paths may be based on the one or more data object types.

Tenant-specific path component 630 may query the multi-tenant data store for tenant-specific paths that are associated with accessing the data objects indicated in the approval message. In some cases, querying the multi-tenant data store for the tenant-specific paths includes transmitting a query message including tenant identifiers for the at least one tenant to a data lake associated with the multi-tenant data store, a metadata database associated with the multi-tenant data store, or a combination thereof. In some cases, the tenant-specific paths include tenant-specific path prefixes.

Virtual computing engine component 635 may initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths. In some cases, virtual computing engine component 635 may identify a number of tenants of the at least one tenant, where initializing the one or more virtual computing engines further includes initializing a number of virtual computing engines for accessing the data objects indicated in the approval message, where the number of virtual computing engines is equal to the identified number of tenants. In some cases, the access role includes an IAM role.

Data object access component 640 may access, via the one or more virtual computing engines, the data objects indicated in the approval message according to the access role for each of the one or more virtual computing engines.

Figure 7:
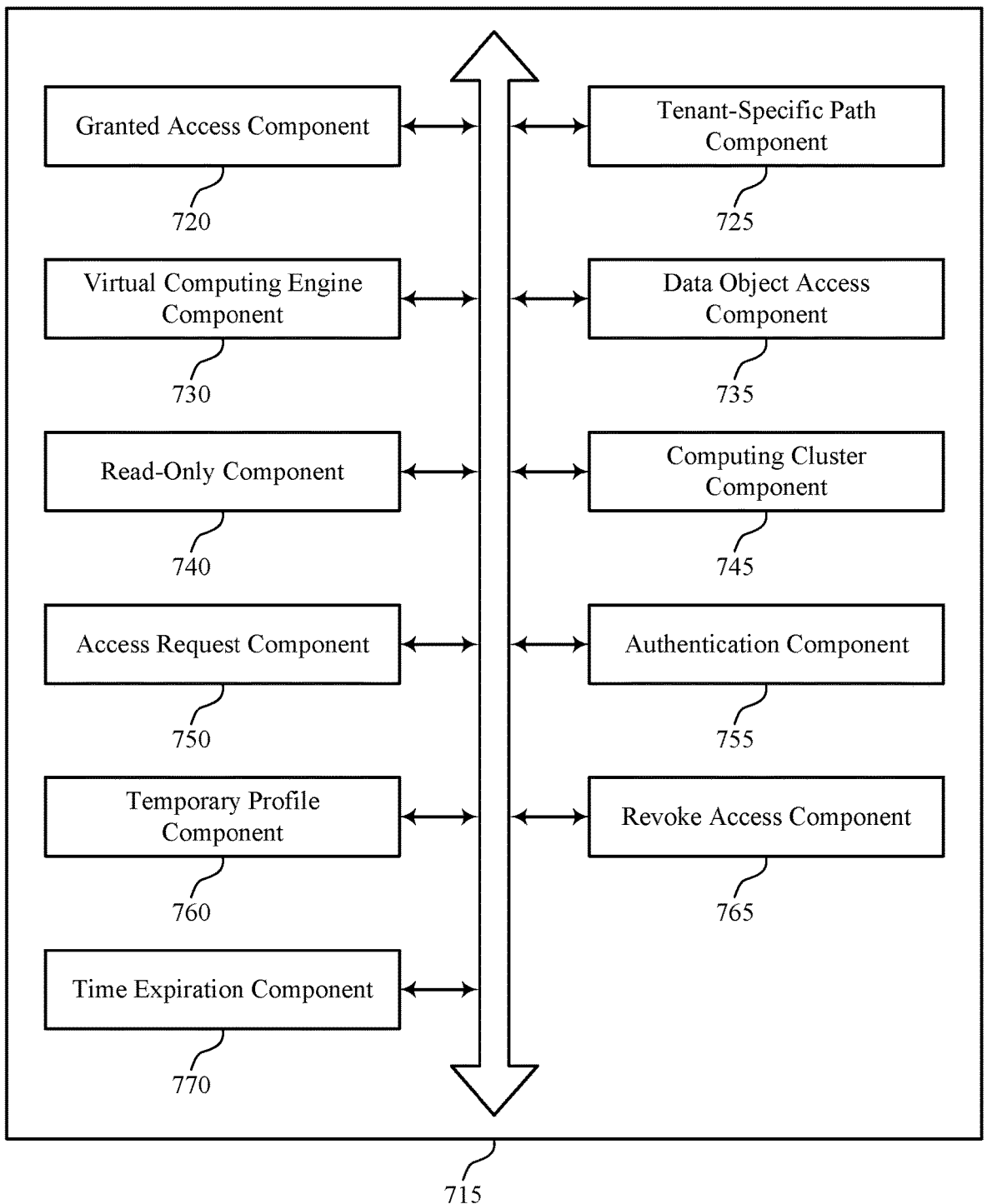

FIG. 7 shows a block diagram 700 of a data access module 715 that supports securely accessing and processing data in a multi-tenant data store in accordance with aspects of the present disclosure. The data access module 715 may be an example of aspects of a data access module 615 or 815 described with reference to FIGS. 6 and 8. The data access module 715 may include granted access component 720, tenant-specific path component 725, virtual computing engine component 730, data object access component 735, read-only component 740, computing cluster component 745, access request component 750, authentication component 755, temporary profile component 760, revoke access component 765, and time expiration component 770. Each of these modules may communicate, directly or indirectly, with one another (e.g., via one or more buses).

Granted access component 720 may receive an approval message that indicates granted access to data objects that are stored in the multi-tenant data store and owned by at least one tenant, and, in some cases, may determine one or more approval users associated with data objects for the at least one tenant, where the approval message is received from one or more user devices corresponding to the one or more approval users. In some cases, the approval message indicates one or more data object types corresponding to the data objects. Accordingly, the tenant-specific paths are based on the one or more data object types.

Tenant-specific path component 725 may query the multi-tenant data store for tenant-specific paths that are associated with accessing the data objects indicated in the approval message. In some cases, querying the multi-tenant data store for the tenant-specific paths includes transmitting a query message including tenant identifiers for the at least one tenant to a data lake associated with the multi-tenant data store, a metadata database associated with the multi-tenant data store, or a combination thereof. In some cases, the tenant-specific paths include tenant-specific path prefixes.

Virtual computing engine component 730 may initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths. In some cases, virtual computing engine component 730 may identify a number of tenants of the at least one tenant, where initializing the one or more virtual computing engines further includes initializing a number of virtual computing engines for accessing the data objects indicated in the approval message, where the number of virtual computing engines is equal to the identified number of tenants. In some cases, the access role includes an IAM role.

Data object access component 735 may access, via the one or more virtual computing engines, the data objects indicated in the approval message according to the access role for each of the one or more virtual computing engines.

Read-only component 740 may retrieve, by the one or more virtual computing engines, copies of the data objects from the multi-tenant data store based on the tenant-specific paths, where each virtual computing engine retrieves respective tenant-specific copies of the data objects corresponding to the single tenant. Read-only component 740 may then host, at the one or more virtual computing engines, the retrieved tenant-specific copies of the data objects, where each virtual computing engine separately hosts the respective tenant-specific copies of the data objects corresponding to the single tenant. As such, read-only component 740 may process the copies of the data objects at the one or more virtual computing engines without modifying the data objects that are stored in the multi-tenant data store. In some cases, the retrieved copies of the data objects correspond to one or more particular data types based on the access role for each of the one or more virtual computing engines. In some cases, the data objects are accessed using read-only permissions according to the access role for each of the one or more virtual computing engines.

Computing cluster component 745 may run the one or more virtual computing engines on a shared computing cluster.

Access request component 750 may receive, from a user device corresponding to a requesting user, an initial access request message including an indication of the data objects, an indication of the at least one tenant, or both. Access request component 750 may then transmit, to the one or more user devices corresponding to the one or more approval users, an indication of the initial access request message, where receiving the approval message is based on the initial access request message.

Authentication component 755 may authenticate the user device, the requesting user, or both using a username, a password, a PIN, a biometric input, a multi-factor authentication, or a combination thereof.

Temporary profile component 760 may generate a temporary user profile based on the approval message, where the temporary user profile has access to one or more tenants of the at least one tenant. Temporary profile component 760 may then transmit, to a user device corresponding to a requesting user, a temporary token associated with the temporary user profile, where the user device may use the temporary token to access one or more data objects stored in the multi-tenant data store and owned by the one or more tenants.

Revoke access component 765 may identify an indication to revoke the granted access to the data objects and revoke, from the user device corresponding to the requesting user, the temporary token associated with the temporary user profile. Accordingly, revoke access component 765 may delete the temporary user profile. Additionally or alternatively, revoke access component 765 may terminate the one or more virtual computing engines for accessing the data objects and revoke access to the data objects indicated in the approval message according to the access role.

Time expiration component 770 may identify an expiration timestamp for accessing the data objects, determine that a current timestamp exceeds the identified expiration timestamp, and revoke access to the data objects indicated in the approval message based on the determining.

Figure 8:
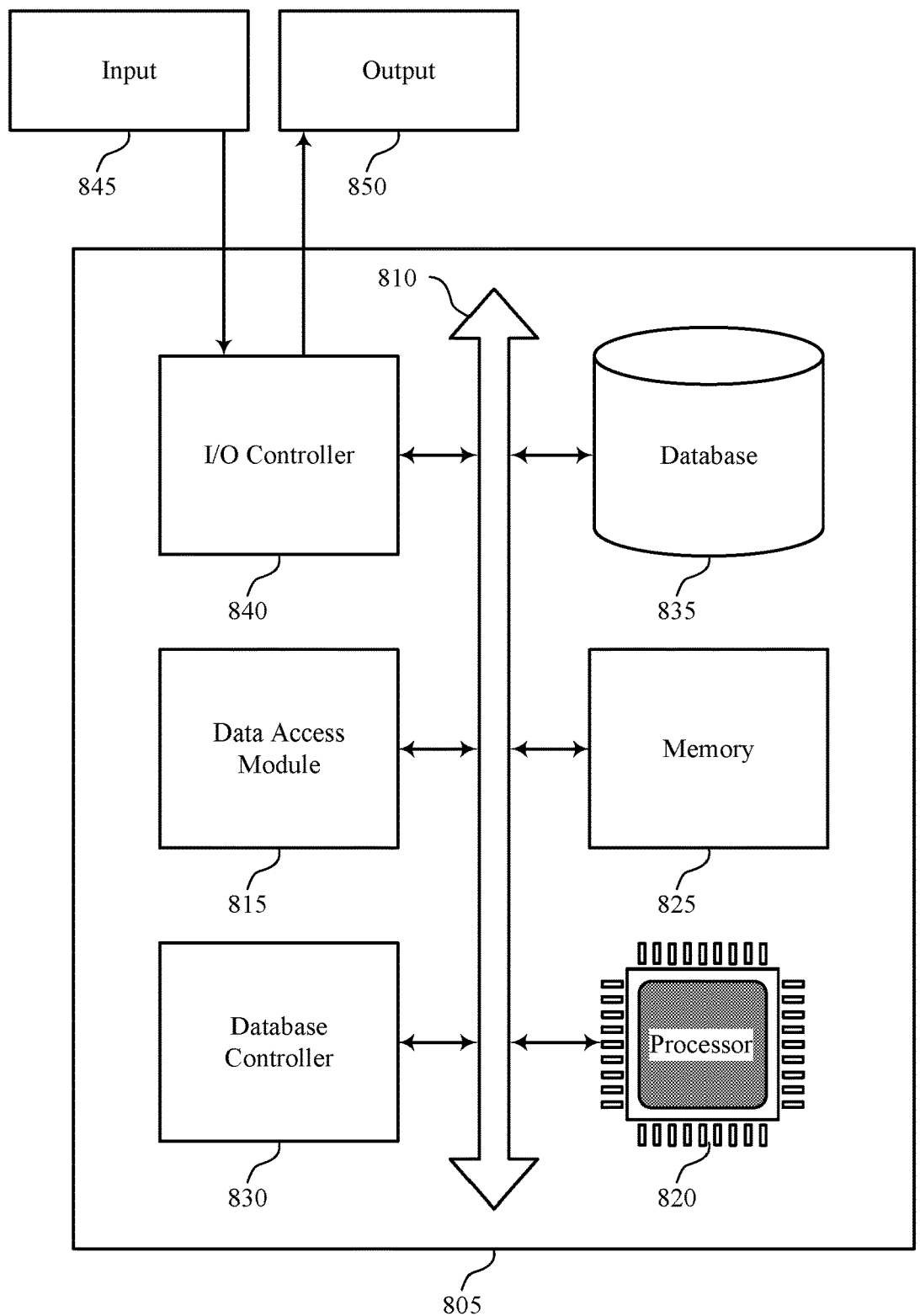
FIG. 8 illustrates a block diagram of a system including a access control server that supports securely accessing and processing data in a multi-tenant data store in accordance with aspects of the present disclosure.

FIG. 8 shows a diagram of a system 800 including a device 805 that supports securely accessing and processing data in a multi-tenant data store in accordance with aspects of the present disclosure. Device 805 may be an example of or include the components of access control server 210, 325, or 440 as described above, e.g., with reference to FIGS. 2, 3, and 4, respectively. Device 805 may include components for bi-directional data communications including components for transmitting and receiving communications, including data access module 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting securely accessing and processing data in a multi-tenant data store).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
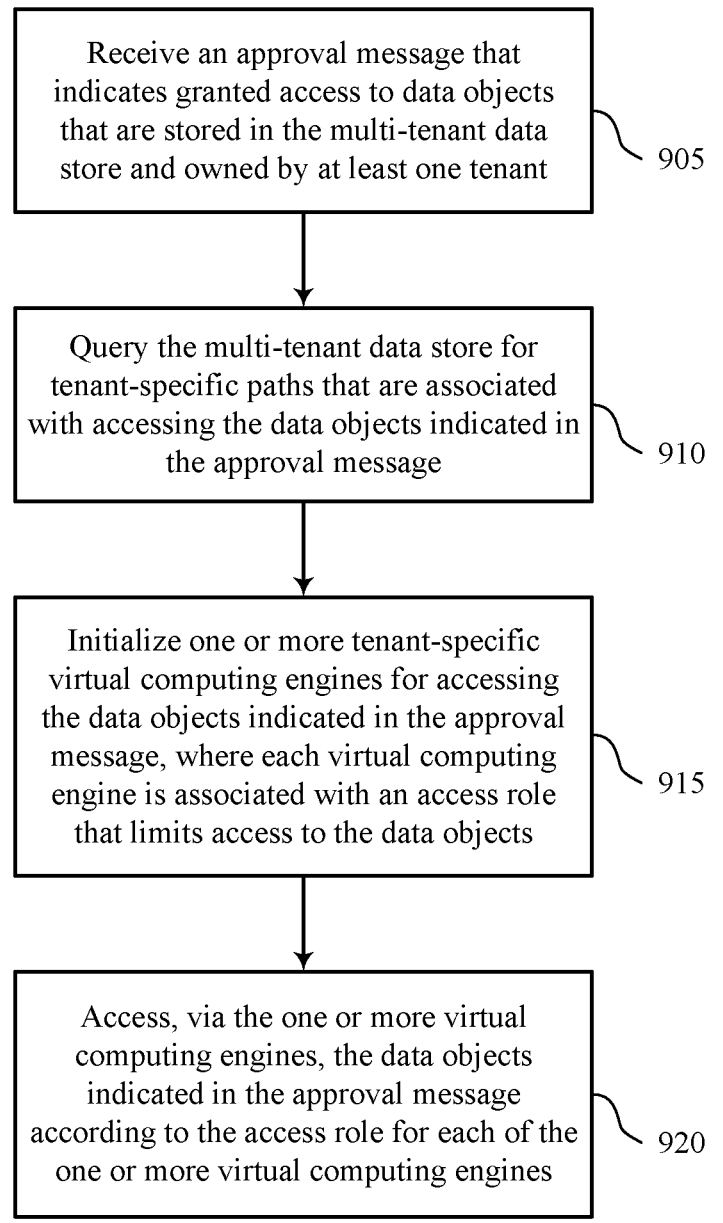
FIGS. 9 through 12 illustrate methods for securely accessing and processing data in a multi-tenant data store in accordance with aspects of the present disclosure.

FIG. 9 shows a flowchart illustrating a method 900 for securely accessing and processing data in a multi-tenant data store in accordance with aspects of the present disclosure. The operations of method 900 may be implemented by an access control server or its components as described herein. For example, the operations of method 900 may be performed by a data access module as described with reference to FIGS. 6 through 8. In some examples, an access control server may execute a set of codes to control the functional elements of the device to perform the functions described below. Additionally or alternatively, the access control server may perform aspects of the functions described below using special-purpose hardware.

At 905 the access control server may receive an approval message that indicates granted access to data objects that are stored in the multi-tenant data store and owned by at least one tenant. The operations of 905 may be performed according to the methods described herein. In certain examples, aspects of the operations of 905 may be performed by a granted access component as described with reference to FIGS. 6 through 8.

At 910 the access control server may query the multi-tenant data store for tenant-specific paths that are associated with accessing the data objects indicated in the approval message. The operations of 910 may be performed according to the methods described herein. In certain examples, aspects of the operations of 910 may be performed by a tenant-specific path component as described with reference to FIGS. 6 through 8.

At 915 the access control server may initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths. The operations of 915 may be performed according to the methods described herein. In certain examples, aspects of the operations of 915 may be performed by a virtual computing engine component as described with reference to FIGS. 6 through 8.

At 920 the access control server may access, via the one or more virtual computing engines, the data objects indicated in the approval message according to the access role for each of the one or more virtual computing engines. The operations of 920 may be performed according to the methods described herein. In certain examples, aspects of the operations of 920 may be performed by a data object access component as described with reference to FIGS. 6 through 8.

Figure 10:
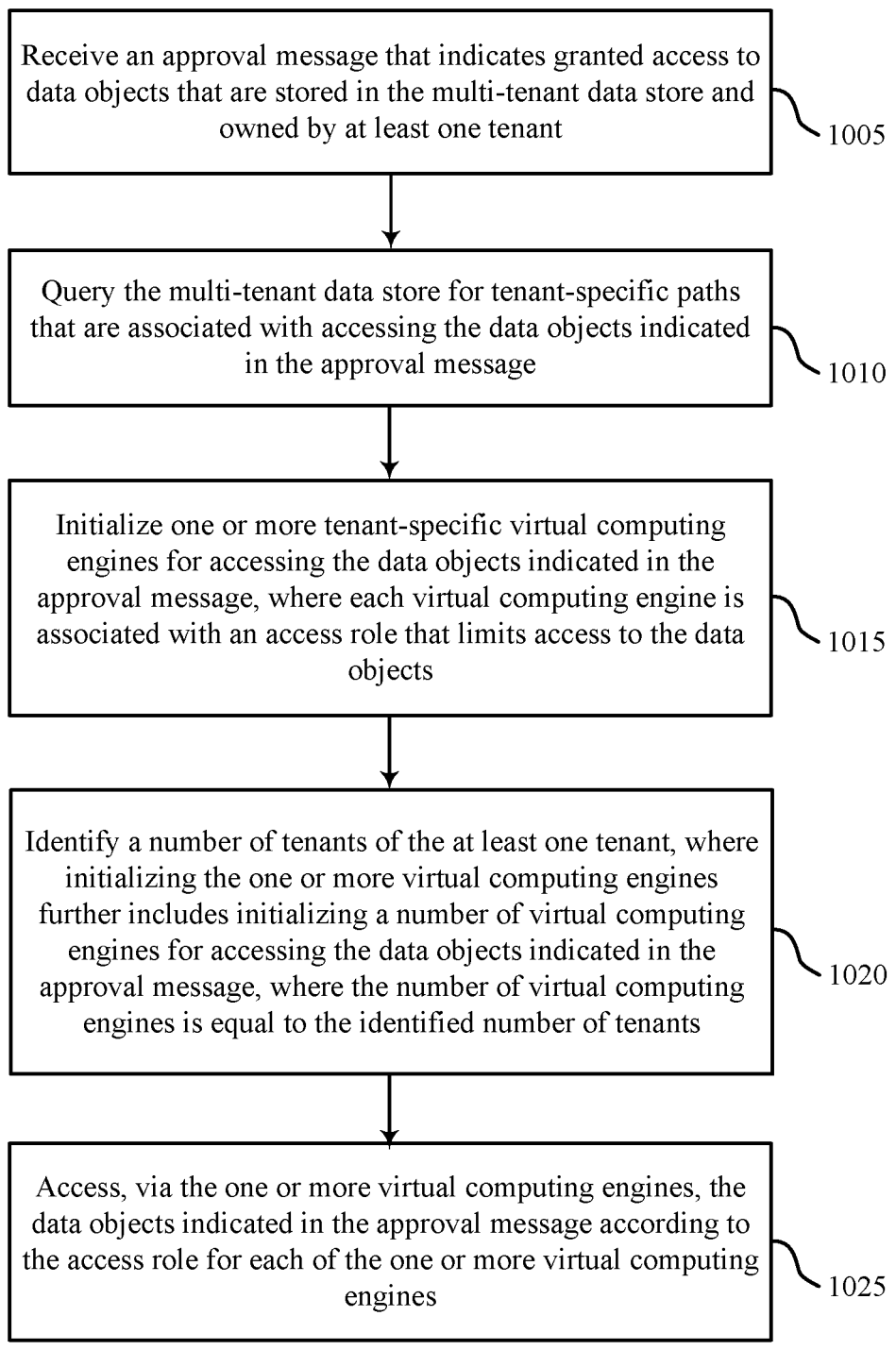

FIG. 10 shows a flowchart illustrating a method 1000 for securely accessing and processing data in a multi-tenant data store in accordance with aspects of the present disclosure. The operations of method 1000 may be implemented by a access control server or its components as described herein. For example, the operations of method 1000 may be performed by a data access module as described with reference to FIGS. 6 through 8. In some examples, a access control server may execute a set of codes to control the functional elements of the device to perform the functions described below. Additionally or alternatively, the access control server may perform aspects of the functions described below using special-purpose hardware.

At 1005 the access control server may receive an approval message that indicates granted access to data objects that are stored in the multi-tenant data store and owned by at least one tenant. The operations of 1005 may be performed according to the methods described herein. In certain examples, aspects of the operations of 1005 may be performed by a granted access component as described with reference to FIGS. 6 through 8.

At 1010 the access control server may query the multi-tenant data store for tenant-specific paths that are associated with accessing the data objects indicated in the approval message. The operations of 1010 may be performed according to the methods described herein. In certain examples, aspects of the operations of 1010 may be performed by a tenant-specific path component as described with reference to FIGS. 6 through 8.

At 1015 the access control server may initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths. The operations of 1015 may be performed according to the methods described herein. In certain examples, aspects of the operations of 1015 may be performed by a virtual computing engine component as described with reference to FIGS. 6 through 8.

At 1020 the access control server may identify a number of tenants of the at least one tenant, where initializing the one or more virtual computing engines further includes initializing a number of virtual computing engines for accessing the data objects indicated in the approval message, where the number of virtual computing engines is equal to the identified number of tenants. The operations of 1020 may be performed according to the methods described herein. In certain examples, aspects of the operations of 1020 may be performed by a virtual computing engine component as described with reference to FIGS. 6 through 8.

At 1025 the access control server may access, via the one or more virtual computing engines, the data objects indicated in the approval message according to the access role for each of the one or more virtual computing engines. The operations of 1025 may be performed according to the methods described herein. In certain examples, aspects of the operations of 1025 may be performed by a data object access component as described with reference to FIGS. 6 through 8.

Figure 11:
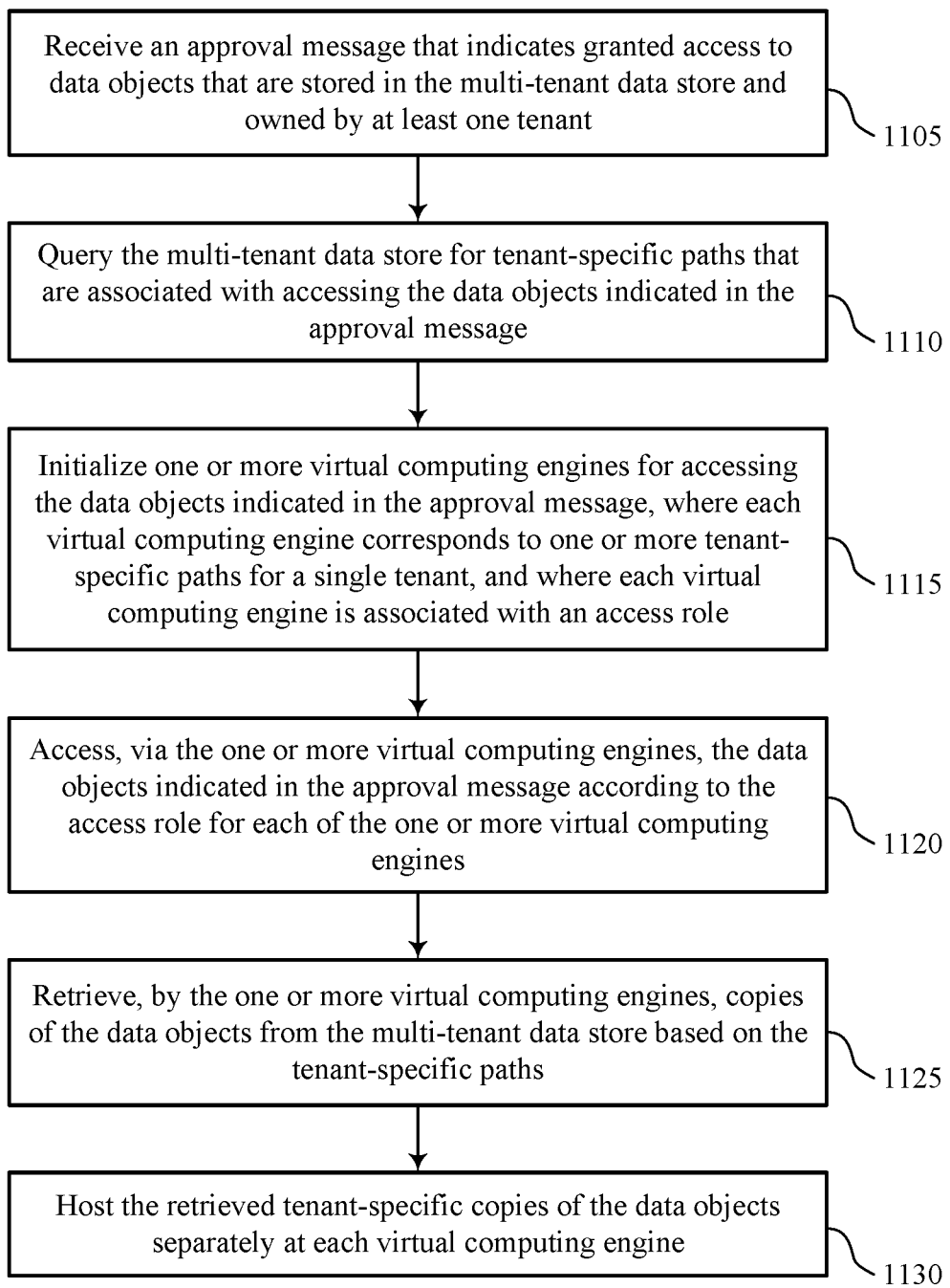

FIG. 11 shows a flowchart illustrating a method 1100 for securely accessing and processing data in a multi-tenant data store in accordance with aspects of the present disclosure. The operations of method 1100 may be implemented by a access control server or its components as described herein. For example, the operations of method 1100 may be performed by a data access module as described with reference to FIGS. 6 through 8. In some examples, a access control server may execute a set of codes to control the functional elements of the device to perform the functions described below. Additionally or alternatively, the access control server may perform aspects of the functions described below using special-purpose hardware.

At 1105 the access control server may receive an approval message that indicates granted access to data objects that are stored in the multi-tenant data store and owned by at least one tenant. The operations of 1105 may be performed according to the methods described herein. In certain examples, aspects of the operations of 1105 may be performed by a granted access component as described with reference to FIGS. 6 through 8.

At 1110 the access control server may query the multi-tenant data store for tenant-specific paths that are associated with accessing the data objects indicated in the approval message. The operations of 1110 may be performed according to the methods described herein. In certain examples, aspects of the operations of 1110 may be performed by a tenant-specific path component as described with reference to FIGS. 6 through 8.

At 1115 the access control server may initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths. The operations of 1115 may be performed according to the methods described herein. In certain examples, aspects of the operations of 1115 may be performed by a virtual computing engine component as described with reference to FIGS. 6 through 8.

At 1120 the access control server may access, via the one or more virtual computing engines, the data objects indicated in the approval message according to the access role for each of the one or more virtual computing engines. The operations of 1120 may be performed according to the methods described herein. In certain examples, aspects of the operations of 1120 may be performed by a data object access component as described with reference to FIGS. 6 through 8.

At 1125 the access control server may retrieve, by the one or more virtual computing engines, copies of the data objects from the multi-tenant data store based on the tenant-specific paths, where each virtual computing engine retrieves respective tenant-specific copies of the data objects corresponding to the single tenant. The operations of 1125 may be performed according to the methods described herein. In certain examples, aspects of the operations of 1125 may be performed by a read-only component as described with reference to FIGS. 6 through 8.

At 1130 the access control server may host, at the one or more virtual computing engines, the retrieved tenant-specific copies of the data objects, where each virtual computing engine separately hosts the respective tenant-specific copies of the data objects corresponding to the single tenant. The operations of 1130 may be performed according to the methods described herein. In certain examples, aspects of the operations of 1130 may be performed by a read-only component as described with reference to FIGS. 6 through 8.

Figure 12:
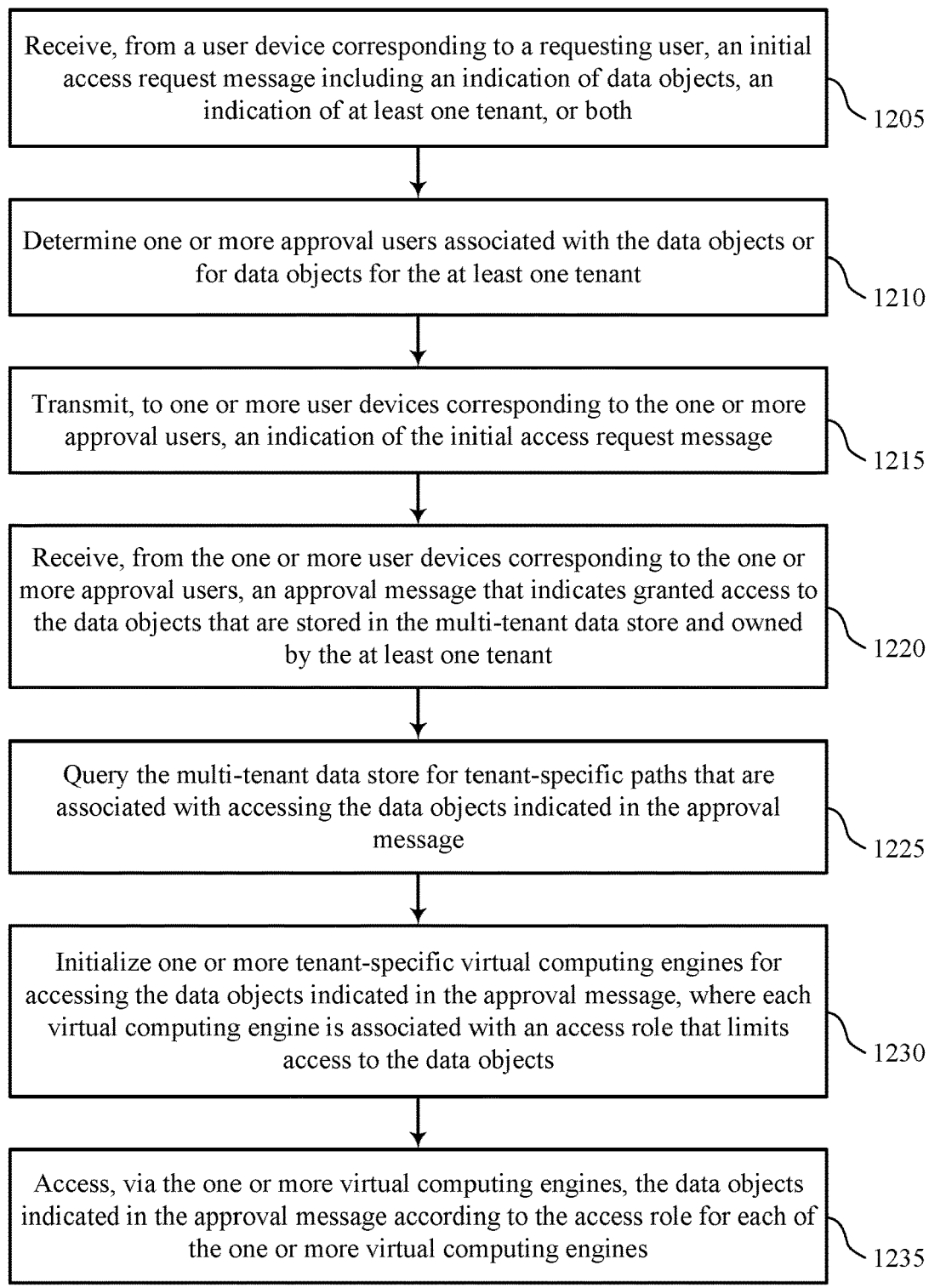

FIG. 12 shows a flowchart illustrating a method 1200 for securely accessing and processing data in a multi-tenant data store in accordance with aspects of the present disclosure. The operations of method 1200 may be implemented by a access control server or its components as described herein. For example, the operations of method 1200 may be performed by a data access module as described with reference to FIGS. 6 through 8. In some examples, a access control server may execute a set of codes to control the functional elements of the device to perform the functions described below. Additionally or alternatively, the access control server may perform aspects of the functions described below using special-purpose hardware.

At 1205 the access control server may receive, from a user device corresponding to a requesting user, an initial access request message comprising an indication of data objects, an indication of at least one tenant, or both. The operations of 1205 may be performed according to the methods described herein. In certain examples, aspects of the operations of 1205 may be performed by an access request component as described with reference to FIGS. 6 through 8.

At 1210 the access control server may determine one or more approval users associated with data objects for the at least one tenant, where the approval message is received from one or more user devices corresponding to the one or more approval users. The operations of 1210 may be performed according to the methods described herein. In certain examples, aspects of the operations of 1210 may be performed by a granted access component as described with reference to FIGS. 6 through 8.

At 1215 the access control server may transmit, to the one or more user devices corresponding to the one or more approval users, an indication of the initial access request message, where receiving an approval message is based on the initial access request message. The operations of 1215 may be performed according to the methods described herein. In certain examples, aspects of the operations of 1215 may be performed by an access request component as described with reference to FIGS. 6 through 8.

At 1220 the access control server may receive the approval message that indicates granted access to the data objects that are stored in the multi-tenant data store and owned by the at least one tenant. The operations of 1220 may be performed according to the methods described herein. In certain examples, aspects of the operations of 1220 may be performed by a granted access component as described with reference to FIGS. 6 through 8.

At 1225 the access control server may query the multi-tenant data store for tenant-specific paths that are associated with accessing the data objects indicated in the approval message. The operations of 1225 may be performed according to the methods described herein. In certain examples, aspects of the operations of 1225 may be performed by a tenant-specific path component as described with reference to FIGS. 6 through 8.

At 1230 the access control server may initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths. The operations of 1230 may be performed according to the methods described herein. In certain examples, aspects of the operations of 1230 may be performed by a virtual computing engine component as described with reference to FIGS. 6 through 8.

At 1235 the access control server may access, via the one or more virtual computing engines, the data objects indicated in the approval message according to the access role for each of the one or more virtual computing engines. The operations of 1235 may be performed according to the methods described herein. In certain examples, aspects of the operations of 1235 may be performed by a data object access component as described with reference to FIGS. 6 through 8.

A method of accessing data in a multi-tenant data store is described. The method may include receiving an approval message that indicates granted access to data objects that are stored in the multi-tenant data store and owned by at least one tenant; querying the multi-tenant data store for tenant-specific paths that are associated with accessing the data objects indicated in the approval message; initializing one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths; and accessing, via the one or more virtual computing engines, the data objects indicated in the approval message according to the access role for each of the one or more virtual computing engines.

Another apparatus for accessing data in a multi-tenant data store is described. The apparatus may include a processor, memory in electronic communication with the processor, and instructions stored in the memory. The instructions may be operable to cause the processor to receive an approval message that indicates granted access to data objects that are stored in the multi-tenant data store and owned by at least one tenant; query the multi-tenant data store for tenant-specific paths that are associated with accessing the data objects indicated in the approval message; initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths; and access, via the one or more virtual computing engines, the data objects indicated in the approval message according to the access role for each of the one or more virtual computing engines.

A non-transitory computer-readable medium for accessing data in a multi-tenant data store is described. The non-transitory computer-readable medium may include instructions operable to cause a processor to receive an approval message that indicates granted access to data objects that are stored in the multi-tenant data store and owned by at least one tenant; query the multi-tenant data store for tenant-specific paths that are associated with accessing the data objects indicated in the approval message; initialize one or more virtual computing engines for accessing the data objects indicated in the approval message, where each virtual computing engine of the one or more virtual computing engines corresponds to one or more tenant-specific paths for a single tenant of the at least one tenant, and where each virtual computing engine of the one or more virtual computing engines is associated with an access role that limits access to the data objects indicated in the approval message for the corresponding one or more tenant-specific paths; and access, via the one or more virtual computing engines, the data objects indicated in the approval message according to the access role for each of the one or more virtual computing engines.

Some examples of the method, apparatus, and non-transitory computer-readable medium described above may further include processes, features, means, or instructions for identifying a number of tenants of the at least one tenant, where initializing the one or more virtual computing engines further includes initializing a number of virtual computing engines for accessing the data objects indicated in the approval message, where the number of virtual computing engines may be equal to the identified number of tenants.

Some examples of the method, apparatus, and non-transitory computer-readable medium described above may further include processes, features, means, or instructions for retrieving, by the one or more virtual computing engines, copies of the data objects from the multi-tenant data store based on the tenant-specific paths, where each virtual computing engine retrieves respective tenant-specific copies of the data objects corresponding to the single tenant. Some examples of the method, apparatus, and non-transitory computer-readable medium described above may further include processes, features, means, or instructions for hosting, at the one or more virtual computing engines, the retrieved tenant-specific copies of the data objects, wherein each virtual computing engine separately hosts the respective tenant-specific copies of the data objects corresponding to the single tenant.

Some examples of the method, apparatus, and non-transitory computer-readable medium described above may further include processes, features, means, or instructions for processing the copies of the data objects at the one or more virtual computing engines without modifying the data objects that may be stored in the multi-tenant data store.

Some examples of the method, apparatus, and non-transitory computer-readable medium described above may further include processes, features, means, or instructions for running the one or more virtual computing engines on a shared computing cluster.

In some examples of the method, apparatus, and non-transitory computer-readable medium described above, the retrieved copies of the data objects correspond to one or more particular data types based on the access role for each of the one or more virtual computing engines.

Some examples of the method, apparatus, and non-transitory computer-readable medium described above may further include processes, features, means, or instructions for determining one or more approval users associated with data objects for the at least one tenant, where the approval message may be received from one or more user devices corresponding to the one or more approval users.

Some examples of the method, apparatus, and non-transitory computer-readable medium described above may further include processes, features, means, or instructions for receiving, from a user device corresponding to a requesting user, an initial access request message comprising an indication of the data objects, an indication of the at least one tenant, or both. Some examples of the method, apparatus, and non-transitory computer-readable medium described above may further include processes, features, means, or instructions for transmitting, to the one or more user devices corresponding to the one or more approval users, an indication of the initial access request message, where receiving the approval message may be based on the initial access request message.

Some examples of the method, apparatus, and non-transitory computer-readable medium described above may further include processes, features, means, or instructions for authenticating the user device, the requesting user, or both using a username, a password, a PIN, a biometric input, a multi-factor authentication, or a combination thereof.

Some examples of the method, apparatus, and non-transitory computer-readable medium described above may further include processes, features, means, or instructions for generating a temporary user profile based on the approval message, where the temporary user profile may have access to one or more tenants of the at least one tenant. Some examples of the method, apparatus, and non-transitory computer-readable medium described above may further include processes, features, means, or instructions for transmitting, to a user device corresponding to a requesting user, a temporary token associated with the temporary user profile, where the user device may use the temporary token to access one or more data objects stored in the multi-tenant data store and owned by the one or more tenants.

Some examples of the method, apparatus, and non-transitory computer-readable medium described above may further include processes, features, means, or instructions for identifying an indication to revoke the granted access to the data objects. Some examples of the method, apparatus, and non-transitory computer-readable medium described above may further include processes, features, means, or instructions for revoking, from the user device corresponding to the requesting user, the temporary token associated with the temporary user profile. Some examples of the method, apparatus, and non-transitory computer-readable medium described above may further include processes, features, means, or instructions for deleting the temporary user profile.

Some examples of the method, apparatus, and non-transitory computer-readable medium described above may further include processes, features, means, or instructions for identifying an indication to revoke the granted access to the data objects. Some examples of the method, apparatus, and non-transitory computer-readable medium described above may further include processes, features, means, or instructions for terminating the one or more virtual computing engines for accessing the data objects. Some examples of the method, apparatus, and non-transitory computer-readable medium described above may further include processes, features, means, or instructions for revoking access to the data objects indicated in the approval message according to the access role.

Some examples of the method, apparatus, and non-transitory computer-readable medium described above may further include processes, features, means, or instructions for identifying an expiration timestamp for accessing the data objects. Some examples of the method, apparatus, and non-transitory computer-readable medium described above may further include processes, features, means, or instructions for determining that a current timestamp exceeds the identified expiration timestamp. Some examples of the method, apparatus, and non-transitory computer-readable medium described above may further include processes, features, means, or instructions for revoking access to the data objects indicated in the approval message based on the determining.

In some examples of the method, apparatus, and non-transitory computer-readable medium described above, querying the multi-tenant data store for the tenant-specific paths includes transmitting a query message comprising tenant identifiers for the at least one tenant to a data lake associated with the multi-tenant data store, a metadata database associated with the multi-tenant data store, or a combination thereof.

In some examples of the method, apparatus, and non-transitory computer-readable medium described above, the approval message indicates one or more data object types corresponding to the data objects. In some examples of the method, apparatus, and non-transitory computer-readable medium described above, the tenant-specific paths may be based on the one or more data object types.

In some examples of the method, apparatus, and non-transitory computer-readable medium described above, the data objects may be accessed using read-only permissions according to the access role for each of the one or more virtual computing engines.

In some examples of the method, apparatus, and non-transitory computer-readable medium described above, the access role includes an IAM role.

In some examples of the method, apparatus, and non-transitory computer-readable medium described above, the tenant-specific paths include tenant-specific path prefixes.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for accessing data in a multi-tenant data store, comprising:
   receiving, from one or more approval users, an approval message that indicates granted access to data objects that are stored in the multi-tenant data store and owned by at least one tenant;
   querying the multi-tenant data store for tenant-specific paths that are associated with accessing the data objects indicated in the approval message;
   initializing one or more virtual computing engines for accessing the data objects indicated in the approval message, wherein each virtual computing engine of the one or more virtual computing engines corresponds to one or more tenant-specific paths for a single tenant of the at least one tenant, and wherein each virtual computing engine of the one or more virtual computing engines is associated with an access role that limits access to the data objects indicated in the approval message for the corresponding one or more tenant-specific paths;
   accessing, via the one or more virtual computing engines, the data objects indicated in the approval message to provide access to a requesting user according to the access role for each of the one or more virtual computing engines; and
   retrieving, by the one or more virtual computing engines, copies of the data objects from the multi-tenant data store based at least in part on the tenant-specific paths, wherein each virtual computing engine retrieves respective tenant-specific copies of the data objects corresponding to the single tenant.

2. The method of claim 1, further comprising:
   identifying a number of tenants of the at least one tenant, wherein initializing the one or more virtual computing engines further comprises:
   initializing a number of virtual computing engines for accessing the data objects indicated in the approval message, wherein the number of virtual computing engines is equal to the identified number of tenants.

3. The method of claim 1, further comprising:
   hosting, at the one or more virtual computing engines, the retrieved tenant-specific copies of the data objects, wherein each virtual computing engine separately hosts the respective tenant-specific copies of the data objects corresponding to the single tenant.

4. The method of claim 3, further comprising:
   processing the copies of the data objects at the one or more virtual computing engines without modifying the data objects that are stored in the multi-tenant data store.

5. The method of claim 3, further comprising:
   running the one or more virtual computing engines on a shared computing cluster.

6. The method of claim 3, wherein the retrieved copies of the data objects correspond to one or more particular data types based at least in part on the access role for each of the one or more virtual computing engines.

7. The method of claim 1, further comprising:
   determining one or more approval users associated with data objects for the at least one tenant, wherein the approval message is received from one or more user devices corresponding to the one or more approval users.

8. The method of claim 7, further comprising:
   receiving, from a user device corresponding to the requesting user, an initial access request message comprising an indication of the data objects, an indication of the at least one tenant, or both; and
   transmitting, to the one or more user devices corresponding to the one or more approval users, an indication of the initial access request message, wherein receiving the approval message is based at least in part on the initial access request message.

9. The method of claim 8, further comprising:
   authenticating the user device, the requesting user, or both using a username, a password, a personal identification number (PIN), a biometric input, a multi-factor authentication, or a combination thereof.

10. The method of claim 1, further comprising:
   generating a temporary user profile based at least in part on the approval message, wherein the temporary user profile has access to one or more tenants of the at least one tenant; and
   transmitting, to a user device corresponding to the requesting user, a temporary token associated with the temporary user profile, wherein the user device may use the temporary token to access one or more data objects stored in the multi-tenant data store and owned by the one or more tenants.

11. The method of claim 10, further comprising:
   identifying an indication to revoke the granted access to the data objects;
   revoking, from the user device corresponding to the requesting user, the temporary token associated with the temporary user profile; and
   deleting the temporary user profile.

12. The method of claim 1, further comprising:
   identifying an indication to revoke the granted access to the data objects;

terminating the one or more virtual computing engines for accessing the data objects; and revoking access to the data objects indicated in the approval message according to the access role.

13. The method of claim 1, further comprising:

identifying an expiration timestamp for accessing the data objects;

determining that a current timestamp exceeds the identified expiration timestamp; and revoking access to the data objects indicated in the approval message based at least in part on the determining.

14. The method of claim 1, wherein querying the multi-tenant data store for the tenant-specific paths comprises:

transmitting a query message comprising tenant identifiers for the at least one tenant to a data lake associated with the multi-tenant data store, a metadata database associated with the multi-tenant data store, or a combination thereof.

15. The method of claim 1, wherein:

the approval message indicates one or more data object types corresponding to the data objects; and the tenant-specific paths are based at least in part on the one or more data object types.

16. The method of claim 1, wherein the data objects are accessed using read-only permissions according to the access role for each of the one or more virtual computing engines.

17. The method of claim 1, wherein the access role comprises an identity and access management (IAM) role.

18. The method of claim 1, wherein the tenant-specific paths comprise tenant-specific path prefixes.

19. An apparatus for accessing data in a multi-tenant data store, comprising:

a processor;

memory in electronic communication with the processor; and instructions stored in the memory and executable by the processor to cause the apparatus to:

receive, from one or more approval users, an approval message that indicates granted access to data objects that are stored in the multi-tenant data store and owned by at least one tenant;

query the multi-tenant data store for tenant-specific paths that are associated with accessing the data objects indicated in the approval message;

initialize one or more virtual computing engines for accessing the data objects indicated in the approval message, wherein each virtual computing engine of the one or more virtual computing engines corresponds to one or more tenant-specific paths for a single tenant of the at least one tenant, and wherein each virtual computing engine of the one or more virtual computing engines is associated with an access role that limits access to the data objects indicated in the approval message for the corresponding one or more tenant-specific paths;

access, via the one or more virtual computing engines, the data objects indicated in the approval message to provide access to a requesting user according to the access role for each of the one or more virtual computing engines; and retrieve, by the one or more virtual computing engines, copies of the data objects from the multi-tenant data store based at least in part on the tenant-specific paths, wherein each virtual computing engine retrieves respective tenant-specific copies of the data objects corresponding to the single tenant.

20. A non-transitory computer-readable medium storing code for accessing data in a multi-tenant data store, the code comprising instructions executable by a processor to:

receive, from one or more approval users, an approval message that indicates granted access to data objects that are stored in the multi-tenant data store and owned by at least one tenant;

query the multi-tenant data store for tenant-specific paths that are associated with accessing the data objects indicated in the approval message;

initialize one or more virtual computing engines for accessing the data objects indicated in the approval message, wherein each virtual computing engine of the one or more virtual computing engines corresponds to one or more tenant-specific paths for a single tenant of the at least one tenant, and wherein each virtual computing engine of the one or more virtual computing engines is associated with an access role that limits access to the data objects indicated in the approval message to provide access to a requesting user for the corresponding one or more tenant-specific paths;

access, via the one or more virtual computing engines, the data objects indicated in the approval message according to the access role for each of the one or more virtual computing engines; and retrieve, by the one or more virtual computing engines, copies of the data objects from the multi-tenant data store based at least in part on the tenant-specific paths, wherein each virtual computing engine retrieves respective tenant-specific copies of the data objects corresponding to the single tenant.

* * * * *